United States Patent
Harris et al.

(10) Patent No.: US 11,855,971 B2
(45) Date of Patent: Dec. 26, 2023

(54) OFFLINE AUTHORIZATION OF INTERACTIONS AND CONTROLLED TASKS

(71) Applicant: Visa International Service Association, San Francisco, CA (US)

(72) Inventors: Theodore Harris, San Francisco, CA (US); Tatiana Korolevskaya, Mountain View, CA (US); Yue Li, San Mateo, CA (US)

(73) Assignee: Visa International Service Association, San Francisco, CA (US)

( * ) Notice: Subject to any disclaimer, the term of this patent is extended or adjusted under 35 U.S.C. 154(b) by 228 days.

(21) Appl. No.: 16/769,551

(22) PCT Filed: Jan. 11, 2018

(86) PCT No.: PCT/US2018/013396
§ 371 (c)(1),
(2) Date: Jun. 3, 2020

(87) PCT Pub. No.: WO2019/139595
PCT Pub. Date: Jul. 18, 2019

(65) Prior Publication Data
US 2021/0234848 A1    Jul. 29, 2021

(51) Int. Cl.
*H04L 9/40* (2022.01)
*H04W 12/67* (2021.01)
*H04W 12/06* (2021.01)

(52) U.S. Cl.
CPC .............. *H04L 63/08* (2013.01); *H04L 63/10* (2013.01); *H04W 12/06* (2013.01); *H04W 12/67* (2021.01); *H04L 63/1433* (2013.01)

(58) Field of Classification Search
None
See application file for complete search history.

(56) References Cited

U.S. PATENT DOCUMENTS 5,608,901 A * 3/1997 Letwin .................. G06F 3/0674
6,077,510 A * 6/2000 Lipkin .................... A61P 31/12
530/388.3

(Continued)

FOREIGN PATENT DOCUMENTS

| EP | 1843274 | 10/2007 | |
| EP | 2515497 | 10/2012 | |
| EP | 2515497 A1 * | 10/2012 | ............. G06F 21/32 |

OTHER PUBLICATIONS

Jayasignhe et al "Extending EMV Tokenised Payments to Offline-Environments," 2016 IEEE TrustCOM—Big DataSE-ISPA, pp. 443-450 (Year: 2016).*

(Continued)

*Primary Examiner* — James R Turchen
*Assistant Examiner* — James J Wilcox
(74) *Attorney, Agent, or Firm* — Kilpatrick Townsend & Stockton LLP

(57) ABSTRACT

A method is disclosed and includes receiving, by a first communication device, a first local authentication model, the first local authentication model being derived from a master authentication model at a remote server computer, and receiving a request to perform an interaction with a second communication device, the interaction being performed in an offline manner. The method may further include applying, by the first communication device, the first local authentication model to the interaction to determine a first authentication result and determining whether or not to allow the interaction to proceed based upon the first authentication result. The method may also include updating the first local authentication model using the master authentication model when the first communication device is online.

15 Claims, 8 Drawing Sheets

(56) References Cited

U.S. PATENT DOCUMENTS

| | | | | |
|---|---|---|---|---|
| 6,113,905 A * | 9/2000 | Lipkin | C07K 14/005 | 435/5 |
| 6,761,124 B1 * | 7/2004 | Srinivasan | B63B 1/107 | 405/195.1 |
| 7,120,559 B1 * | 10/2006 | Williams | G06F 11/0706 | 702/185 |
| 7,200,525 B1 * | 4/2007 | Williams | G06F 11/008 | 714/E11.02 |
| 7,203,881 B1 * | 4/2007 | Williams | G06F 11/261 | 714/33 |
| 7,379,846 B1 * | 5/2008 | Williams | G06F 11/079 | 714/25 |
| 7,516,025 B1 * | 4/2009 | Williams | G05B 23/0278 | 702/182 |
| 7,644,863 B2 * | 1/2010 | Chen | G06Q 10/06 | 705/28 |
| 7,826,381 B1 * | 11/2010 | Kastuar | H04L 12/4641 | 370/242 |
| 8,472,728 B1 * | 6/2013 | Chau | G06F 18/2433 | 382/226 |
| 8,667,017 B1 * | 3/2014 | Forney | G06Q 50/06 | 707/782 |
| 8,861,340 B1 * | 10/2014 | Atlas | H04L 45/28 | 370/227 |
| 8,886,586 B2 * | 11/2014 | Osmond | G06N 5/025 | 706/46 |
| 8,958,286 B1 * | 2/2015 | Atlas | H04L 12/18 | 370/227 |
| 9,100,328 B1 * | 8/2015 | Atlas | H04L 45/28 | |
| 9,117,316 B1 * | 8/2015 | Crutchfield, Jr. | A63F 13/58 | |
| 9,266,626 B2 * | 2/2016 | Cheriere | G06F 11/0739 | |
| 9,390,272 B2 * | 7/2016 | Barnes | H04L 63/04 | |
| 10,116,680 B1 * | 10/2018 | Han | G06F 21/552 | |
| 10,366,378 B1 * | 7/2019 | Han | G06Q 20/425 | |
| 10,481,989 B2 * | 11/2019 | Höfig | G06F 11/008 | |
| 10,725,748 B2 * | 7/2020 | Narayanan | G06N 20/00 | |
| 10,874,464 B2 * | 12/2020 | Roh | G16H 50/20 | |
| 10,963,791 B2 * | 3/2021 | Turner | G06F 17/18 | |
| 10,997,511 B2 * | 5/2021 | Turner | G06Q 40/03 | |
| 11,010,669 B2 * | 5/2021 | Turner | G06N 5/01 | |
| 11,069,082 B1 * | 7/2021 | Ebrahimi Afrouzi | G06T 7/521 | |
| 11,153,503 B1 * | 10/2021 | Ebrahimi Afrouzi | H04N 23/51 | |
| 11,165,954 B1 * | 11/2021 | Beach | H04N 23/65 | |
| 11,274,929 B1 * | 3/2022 | Afrouzi | G06T 7/55 | |
| 11,302,080 B1 * | 4/2022 | Drummond | G06N 5/02 | |
| PP34,185 P2 * | 5/2022 | Maillard | Plt./188 | |
| PP34,208 P2 * | 5/2022 | Maillard | Plt./188 | |
| PP34,210 P2 * | 5/2022 | Maillard | A01H 6/7463 | Plt./195 |
| PP34,239 P2 * | 5/2022 | Maillard | Plt./195 | |
| 11,348,269 B1 * | 5/2022 | Ebrahimi Afrouzi | G06T 7/344 | |
| 11,443,286 B1 * | 9/2022 | Janiczek | G06Q 10/1097 | |
| 11,494,865 B2 * | 11/2022 | Bielby | G06V 40/70 | |
| 11,503,075 B1 * | 11/2022 | Sirianni | H04L 63/1416 | |
| 11,507,099 B2 * | 11/2022 | Stetson | G06V 10/774 | |
| 11,522,887 B2 * | 12/2022 | Dunn | G06F 21/556 | |
| 11,528,262 B2 * | 12/2022 | Carru | H04L 63/0807 | |
| 11,550,921 B2 * | 1/2023 | Cornell | H04L 63/1441 | |
| 11,558,407 B2 * | 1/2023 | Cassidy | H04L 43/067 | |
| 11,558,427 B2 * | 1/2023 | Verma | H04W 12/088 | |
| 11,586,655 B2 * | 2/2023 | Harris | G06F 16/3344 | |
| 11,588,827 B2 * | 2/2023 | Okano | H04L 63/1416 | |
| 11,601,411 B2 * | 3/2023 | Gupta | H04L 63/083 | |
| 2002/0052858 A1 * | 5/2002 | Goldman | G06N 5/025 | 706/15 |
| 2002/0133721 A1 * | 9/2002 | Adjaoute | H04L 63/0407 | 726/23 |
| 2002/0152160 A1 * | 10/2002 | Allen-Rouman | G06Q 40/04 | 705/39 |
| 2003/0059750 A1 * | 3/2003 | Bindler | G06Q 10/10 | 434/236 |
| 2003/0093367 A1 * | 5/2003 | Allen-Rouman | G06Q 20/10 | 705/40 |
| 2003/0126075 A1 * | 7/2003 | Mascavage, III | G06Q 20/10 | 705/42 |
| 2003/0187786 A1 * | 10/2003 | Swift | G06Q 20/0425 | 705/39 |
| 2003/0187790 A1 * | 10/2003 | Swift | G06Q 20/102 | 705/40 |
| 2003/0191709 A1 * | 10/2003 | Elston | G06Q 20/04 | 705/40 |
| 2004/0068515 A1 * | 4/2004 | Hallman | G06F 9/451 | 707/999.102 |
| 2004/0075677 A1 * | 4/2004 | Loyall | G10L 13/033 | 715/706 |
| 2004/0127124 A1 * | 7/2004 | Hexels | F41H 3/02 | 442/131 |
| 2004/0210345 A1 * | 10/2004 | Noda | G05D 1/0227 | 318/568.12 |
| 2005/0071306 A1 * | 3/2005 | Kruszewski | A63F 13/45 | 345/473 |
| 2005/0149455 A1 * | 7/2005 | Bruesewitz | G06Q 20/40 | 705/64 |
| 2006/0041840 A1 * | 2/2006 | Blair | G06F 17/00 | 715/234 |
| 2006/0053490 A1 * | 3/2006 | Herz | H04L 63/1425 | 726/23 |
| 2006/0099591 A1 * | 5/2006 | Krause | C12Q 1/6883 | 435/6.16 |
| 2006/0106717 A1 * | 5/2006 | Randle | G06Q 20/12 | 705/45 |
| 2006/0136332 A1 * | 6/2006 | Ziegler | G06F 21/445 | 705/39 |
| 2006/0282660 A1 * | 12/2006 | Varghese | G07F 7/1083 | 713/155 |
| 2007/0122347 A1 * | 5/2007 | Statnikov | G16B 40/00 | 424/9.341 |
| 2007/0186273 A1 | 8/2007 | Carpy et al. | | |
| 2007/0197921 A1 * | 8/2007 | Cohen | A61B 5/02116 | 600/485 |
| 2007/0244807 A1 * | 10/2007 | Andringa | G06Q 40/08 | 705/38 |
| 2007/0260401 A1 * | 11/2007 | Sydor | G06Q 40/08 | 707/999.001 |
| 2008/0052101 A1 * | 2/2008 | Ziade | G06Q 40/08 | 705/4 |
| 2008/0052135 A1 * | 2/2008 | Ziade | G06Q 40/00 | 705/4 |
| 2008/0052136 A1 * | 2/2008 | Ziade | G06Q 40/03 | 705/4 |
| 2008/0052137 A1 * | 2/2008 | Ziade | G06Q 40/06 | 705/4 |
| 2008/0065414 A1 * | 3/2008 | Schoenberg | G16H 10/20 | 705/2 |
| 2008/0065426 A1 * | 3/2008 | Ziade | G06Q 40/08 | 705/4 |
| 2008/0065726 A1 * | 3/2008 | Schoenberg | G16H 10/60 | 709/205 |
| 2008/0066179 A1 * | 3/2008 | Liu | G06F 21/562 | 726/24 |
| 2008/0084283 A1 * | 4/2008 | Kalik | B60Q 9/00 | 701/301 |
| 2008/0104032 A1 * | 5/2008 | Sarkar | G06F 16/958 | 707/999.102 |
| 2008/0190377 A1 * | 8/2008 | Clowder | A01K 15/024 | 119/706 |
| 2008/0223498 A1 * | 9/2008 | Bertini | H01B 7/285 | 156/48 |
| 2008/0263654 A1 * | 10/2008 | Bahl | H04L 67/563 | 726/15 |
| 2008/0279113 A1 * | 11/2008 | Kalliola | H04L 43/00 | 370/252 |
| 2008/0281726 A1 * | 11/2008 | Gupta | G06Q 40/03 | 705/26.1 |
| 2009/0089074 A1 * | 4/2009 | Schoenberg | G16H 70/00 | 705/2 |
| 2009/0089085 A1 * | 4/2009 | Schoenberg | G16H 40/20 | 705/2 |

(56) References Cited

U.S. PATENT DOCUMENTS

| | | | |
|---|---|---|---|
| 2009/0089086 A1* | 4/2009 | Schoenberg | G16H 40/67 705/2 |
| 2009/0089088 A1* | 4/2009 | Schoenberg | G06Q 30/08 705/2 |
| 2009/0089096 A1* | 4/2009 | Schoenberg | G16H 40/20 379/88.22 |
| 2009/0089097 A1* | 4/2009 | Schoenberg | G16H 50/30 705/2 |
| 2009/0089098 A1* | 4/2009 | Schoenberg | G16H 50/20 705/3 |
| 2009/0089147 A1* | 4/2009 | Schoenberg | G06Q 10/06 705/2 |
| 2009/0089869 A1* | 4/2009 | Varghese | G06Q 20/4014 726/7 |
| 2009/0112623 A1* | 4/2009 | Schoenberg | G06Q 10/02 705/2 |
| 2009/0113312 A1* | 4/2009 | Schoenberg | H04L 67/306 709/204 |
| 2009/0138317 A1* | 5/2009 | Schoenberg | H04L 67/562 705/2 |
| 2009/0150252 A1* | 6/2009 | Schoenberg | G06Q 30/0601 705/26.1 |
| 2009/0167763 A1* | 7/2009 | Waechter | G06T 15/40 345/426 |
| 2009/0235407 P1* | 9/2009 | Maillard | A01H 5/08 Plt./190 |
| 2009/0254361 A1* | 10/2009 | Schoenberg | G16H 40/67 705/2 |
| 2009/0262919 A1* | 10/2009 | Schoenberg | G16H 40/67 379/221.02 |
| 2009/0300712 A1* | 12/2009 | Kaufmann | G06F 21/6218 707/999.1 |
| 2009/0313076 A1* | 12/2009 | Schoenberg | G16H 40/20 705/2 |
| 2009/0319296 A1* | 12/2009 | Schoenberg | G16H 10/60 705/2 |
| 2009/0322510 A1* | 12/2009 | Berger | H04W 60/00 340/568.1 |
| 2010/0057603 A1* | 3/2010 | Janowski | G06Q 40/06 705/37 |
| 2010/0057622 A1* | 3/2010 | Faith | G06Q 20/3829 705/38 |
| 2010/0094791 A1* | 4/2010 | Miltonberger | G06Q 10/067 706/46 |
| 2010/0106533 A1* | 4/2010 | Alvarez | G06Q 10/103 705/4 |
| 2010/0114776 A1* | 5/2010 | Weller | G06Q 20/4016 705/325 |
| 2010/0192209 A1 | 7/2010 | Steeves et al. | |
| 2010/0222649 A1* | 9/2010 | Schoenberg | G16H 40/67 705/2 |
| 2010/0228624 A1* | 9/2010 | Morris | G06F 21/34 705/14.54 |
| 2010/0299792 P1* | 11/2010 | Maillard | A01H 5/08 Plt./189 |
| 2010/0326667 A1* | 12/2010 | Coppens | B63B 21/507 114/230.1 |
| 2011/0021263 A1* | 1/2011 | Anderson | G07F 17/3232 463/25 |
| 2011/0023115 A1* | 1/2011 | Wright | G06F 21/552 726/22 |
| 2011/0023118 A1* | 1/2011 | Wright | H04L 63/1416 726/23 |
| 2011/0040569 A1* | 2/2011 | Schoenberg | G16H 40/67 709/224 |
| 2011/0077761 A1* | 3/2011 | Copello | G06F 16/217 700/99 |
| 2011/0093418 A1* | 4/2011 | Kwok | G06N 3/006 706/12 |
| 2011/0096955 A1* | 4/2011 | Voloshynovskiy | G07F 7/0813 382/103 |
| 2011/0106593 A1* | 5/2011 | Schoenberg | G06Q 30/02 705/14.1 |
| 2011/0154497 A1* | 6/2011 | Bailey, Jr. | H04L 63/1433 726/25 |
| 2011/0208601 A1* | 8/2011 | Ferguson | G06Q 40/02 705/16 |
| 2011/0247069 A1* | 10/2011 | Slater | G06F 21/577 726/22 |
| 2011/0276487 A1* | 11/2011 | Hammad | G06Q 20/40 726/3 |
| 2012/0005019 A1* | 1/2012 | LeBlanc | G06Q 30/0255 705/14.53 |
| 2012/0030757 A1* | 2/2012 | Baikalov | G06F 21/57 726/22 |
| 2012/0041881 A1* | 2/2012 | Basu | G06Q 20/382 705/67 |
| 2012/0042383 A1* | 2/2012 | Greene | G06F 21/57 726/25 |
| 2012/0042384 A1* | 2/2012 | Badhwar | G06F 21/128 726/25 |
| 2012/0066065 A1* | 3/2012 | Switzer | G06Q 30/0255 705/1.1 |
| 2012/0079596 A1* | 3/2012 | Thomas | G06F 21/565 726/24 |
| 2012/0096546 A1* | 4/2012 | Dilley | H04L 67/561 715/236 |
| 2012/0143752 A1* | 6/2012 | Wong | G06Q 20/4012 705/41 |
| 2012/0144376 A1* | 6/2012 | Van Eijndhoven | G06F 8/456 717/146 |
| 2012/0191594 A1* | 7/2012 | Welch | G06Q 40/02 705/38 |
| 2012/0227141 P1* | 9/2012 | Maillard | A01H 6/7454 Plt./188 |
| 2012/0227146 P1* | 9/2012 | Maillard | A01H 6/7463 Plt./195 |
| 2012/0284175 A1* | 11/2012 | Wilson | G06Q 20/10 705/39 |
| 2012/0323717 A1* | 12/2012 | Kirsch | G06Q 20/382 705/26.1 |
| 2013/0007698 A1* | 1/2013 | Warila | G06F 40/151 717/106 |
| 2013/0076373 A1* | 3/2013 | Karenowska | F01D 21/04 324/603 |
| 2013/0085916 A1* | 4/2013 | Abbe | G06Q 40/06 705/35 |
| 2013/0097706 A1* | 4/2013 | Titonis | G06F 21/566 726/22 |
| 2013/0117177 A1* | 5/2013 | MacMillan | G06Q 20/349 705/40 |
| 2013/0145463 A1* | 6/2013 | Ghosh | G06F 21/53 726/22 |
| 2013/0242795 A1* | 9/2013 | Heen | H04L 63/1425 370/252 |
| 2013/0263337 P1* | 10/2013 | Maillard | A01H 6/7454 Plt./188 |
| 2013/0268357 A1* | 10/2013 | Heath | G06Q 10/10 726/26 |
| 2014/0031024 A1* | 1/2014 | Xie | G06Q 20/36 455/418 |
| 2014/0040139 A1* | 2/2014 | Brudnicki | G06Q 20/3224 705/44 |
| 2014/0058938 A1* | 2/2014 | McClung, III | G06Q 20/36 705/41 |
| 2014/0074689 A1* | 3/2014 | Lund | G06Q 40/03 705/38 |
| 2014/0109174 A1* | 4/2014 | Barton | H04W 12/06 726/1 |
| 2014/0109175 A1* | 4/2014 | Barton | H04L 63/0807 726/1 |
| 2014/0129457 A1* | 5/2014 | Peeler | G06Q 30/018 705/317 |
| 2014/0165170 A1* | 6/2014 | Dmitriev | H04W 12/069 726/7 |
| 2014/0176216 A1* | 6/2014 | Thonnart | H01L 27/0207 257/202 |

(56) References Cited

U.S. PATENT DOCUMENTS

| | | | |
|---|---|---|---|
| 2014/0181972 A1* | 6/2014 | Karta | H04L 63/1416 726/23 |
| 2014/0187177 A1* | 7/2014 | Sridhara | G06N 5/01 455/73 |
| 2014/0199962 A1* | 7/2014 | Mohammed | H04M 15/8033 455/406 |
| 2014/0229339 A1* | 8/2014 | Massiere | G06Q 20/40 705/26.81 |
| 2014/0237599 A1* | 8/2014 | Gertner | H04L 63/1425 726/24 |
| 2014/0279556 A1* | 9/2014 | Priebatsch | G06Q 20/385 705/67 |
| 2014/0304131 A1* | 10/2014 | Gangopadhyay | G06Q 40/02 705/35 |
| 2014/0316797 A1* | 10/2014 | Biernacki | G16H 50/30 705/2 |
| 2014/0325220 A1* | 10/2014 | Tunnell | H04L 9/3215 713/168 |
| 2014/0330406 A1* | 11/2014 | Faris | A01G 31/00 700/90 |
| 2014/0337862 A1* | 11/2014 | Valencia | G06F 21/45 719/313 |
| 2014/0373091 A1* | 12/2014 | Kirner | H04L 63/1416 726/1 |
| 2014/0377727 A1* | 12/2014 | Yom-Tov | G16H 50/20 434/236 |
| 2015/0012467 A1* | 1/2015 | Greystoke | G06Q 30/0619 706/12 |
| 2015/0026027 A1* | 1/2015 | Priess | G06Q 10/04 705/35 |
| 2015/0046369 A1* | 2/2015 | Taylor | G06Q 10/10 705/342 |
| 2015/0058988 A1* | 2/2015 | Katz | H04L 63/1416 726/23 |
| 2015/0081890 A1* | 3/2015 | Richards | H04M 15/47 709/224 |
| 2015/0088739 A1* | 3/2015 | Desai | G06Q 20/322 705/42 |
| 2015/0127547 A1* | 5/2015 | Powell | G06Q 20/382 705/67 |
| 2015/0150107 A1* | 5/2015 | Piliouras | H04L 63/102 726/7 |
| 2015/0161386 A1* | 6/2015 | Gupta | G06N 5/04 726/22 |
| 2015/0193588 A1* | 7/2015 | Nemoto | G16H 10/60 705/2 |
| 2015/0199689 A1* | 7/2015 | Kumnick | G06Q 20/3674 705/67 |
| 2015/0220917 A1* | 8/2015 | Aabye | G06Q 20/3278 705/64 |
| 2015/0220928 A1* | 8/2015 | Allen | G06Q 20/10 705/67 |
| 2015/0237778 P1* | 8/2015 | Maillard | A01H 6/7454 Plt./188 |
| 2015/0242840 A1* | 8/2015 | Kursun | G06F 21/552 705/44 |
| 2015/0269383 A1* | 9/2015 | Lang | G06F 21/57 726/1 |
| 2015/0269566 A1* | 9/2015 | Gaddam | G06Q 20/385 705/67 |
| 2015/0269578 A1* | 9/2015 | Subramanian | G06Q 20/12 705/44 |
| 2015/0269579 A1* | 9/2015 | Subramanian | G06Q 20/4012 705/44 |
| 2015/0269580 A1* | 9/2015 | Subramanian | G06Q 20/4016 705/44 |
| 2015/0271969 P1* | 9/2015 | Maillard | A01H 6/7463 Plt./195 |
| 2015/0309980 A1* | 10/2015 | Glass | G06F 9/543 715/219 |
| 2015/0310188 A1* | 10/2015 | Ford | H04L 63/0428 726/28 |
| 2015/0317633 A1* | 11/2015 | Saunders | G06Q 20/405 705/44 |
| 2015/0319185 A1* | 11/2015 | Kirti | H04L 63/1416 726/23 |
| 2015/0319610 A1* | 11/2015 | Hartog | H04L 63/1441 455/419 |
| 2015/0339346 A1* | 11/2015 | Berchtold | G05B 13/04 707/722 |
| 2015/0339664 A1* | 11/2015 | Wong | G06Q 20/4015 705/71 |
| 2015/0347751 A1* | 12/2015 | Card | H04L 51/214 726/23 |
| 2015/0350174 A1* | 12/2015 | Reno | H04L 63/1433 726/25 |
| 2015/0363769 A1* | 12/2015 | Ronca | G06Q 20/381 705/64 |
| 2015/0363770 A1* | 12/2015 | Ronca | G06Q 20/382 705/64 |
| 2015/0363772 A1* | 12/2015 | Ronca | G06Q 20/3829 705/71 |
| 2015/0363773 A1* | 12/2015 | Ronca | G06Q 40/02 705/71 |
| 2015/0363777 A1* | 12/2015 | Ronca | H04L 9/3236 705/75 |
| 2015/0363778 A1* | 12/2015 | Ronca | H04L 9/3236 705/71 |
| 2015/0363782 A1* | 12/2015 | Ronca | G06Q 20/4016 705/75 |
| 2015/0363783 A1* | 12/2015 | Ronca | G06Q 20/382 705/71 |
| 2015/0363876 A1* | 12/2015 | Ronca | G06Q 40/04 705/37 |
| 2015/0365283 A1* | 12/2015 | Ronca | G06Q 20/065 705/71 |
| 2015/0365388 A1* | 12/2015 | Little | G06F 21/552 726/7 |
| 2015/0372811 A1* | 12/2015 | Le Saint | H04L 63/068 705/76 |
| 2016/0005044 A1* | 1/2016 | Moss | G06Q 20/4016 705/44 |
| 2016/0019215 A1* | 1/2016 | Murphey | G06F 16/24565 707/723 |
| 2016/0019316 A1* | 1/2016 | Murphey | G06F 16/9032 707/722 |
| 2016/0036807 A1* | 2/2016 | Knauss | H04L 63/0838 726/7 |
| 2016/0042345 A1* | 2/2016 | Kopczynski | G06Q 20/3678 705/69 |
| 2016/0043932 A1* | 2/2016 | Karthikeyan | H04L 12/18 370/390 |
| 2016/0055490 A1* | 2/2016 | Keren | G06Q 30/00 705/14.47 |
| 2016/0063209 A1* | 3/2016 | Malaviya | G16H 50/50 706/12 |
| 2016/0065370 A1* | 3/2016 | Le Saint | H04L 9/14 713/155 |
| 2016/0086185 A1* | 3/2016 | Adjaoute | G06Q 20/4016 705/44 |
| 2016/0117466 A1* | 4/2016 | Singh | G06Q 50/265 702/19 |
| 2016/0162882 A1* | 6/2016 | McClung, III | G06Q 20/352 705/41 |
| 2016/0170868 A1* | 6/2016 | Hoefig | G06F 11/3684 714/38.1 |
| 2016/0173483 A1* | 6/2016 | Wong | H04W 12/06 726/9 |
| 2016/0188834 A1* | 6/2016 | Erdmann | G16Z 99/00 705/3 |
| 2016/0198978 A1* | 7/2016 | Nemoto | A61B 5/7435 600/302 |
| 2016/0203485 A1* | 7/2016 | Subramanian | G06Q 30/00 705/44 |
| 2016/0210633 A1* | 7/2016 | Epelman | G06Q 20/3224 |
| 2016/0217464 A1* | 7/2016 | Jajara | G06Q 20/322 |
| 2016/0218875 A1* | 7/2016 | Le Saint | H04L 9/0825 |
| 2016/0260100 A1* | 9/2016 | Wiesman | G06Q 20/4016 |

(56) References Cited

U.S. PATENT DOCUMENTS

| | | | |
|---|---|---|---|
| 2016/0269402 A1* | 9/2016 | Carter | H04L 9/30 |
| 2016/0269908 A1* | 9/2016 | Richards | G06Q 20/08 |
| 2016/0294800 A1* | 10/2016 | Oppenheim, Jr. | G06F 16/2455 |
| 2016/0294959 A1* | 10/2016 | Cho | G06Q 90/00 |
| 2016/0300214 A1* | 10/2016 | Chaffin | G06Q 20/22 |
| 2016/0306965 A1* | 10/2016 | Iyer | G06Q 10/0635 |
| 2016/0364678 A1* | 12/2016 | Cao | G06Q 10/083 |
| 2016/0364679 A1* | 12/2016 | Cao | G06Q 50/30 |
| 2016/0364812 A1* | 12/2016 | Cao | G06Q 50/30 |
| 2016/0364823 A1* | 12/2016 | Cao | G01C 21/3438 |
| 2016/0378861 A1* | 12/2016 | Eledath | G06V 20/52 707/766 |
| 2016/0379220 A1* | 12/2016 | Tunnell | H04W 12/068 705/71 |
| 2017/0006028 A1* | 1/2017 | Tunnell | H04W 12/06 |
| 2017/0006135 A1* | 1/2017 | Siebel | G06Q 10/06 |
| 2017/0017957 A1* | 1/2017 | Radu | G06Q 20/4012 |
| 2017/0017977 A1* | 1/2017 | Herriger | G06Q 30/0283 |
| 2017/0018001 A1* | 1/2017 | Tunnell | G06Q 30/0269 |
| 2017/0024363 A1* | 1/2017 | Tocchini | G06N 7/01 |
| 2017/0024403 A1* | 1/2017 | Tocchini | G06F 11/3632 |
| 2017/0024404 A1* | 1/2017 | Tocchini | G06F 40/106 |
| 2017/0041296 A1* | 2/2017 | Ford | G06F 21/64 |
| 2017/0046510 A1* | 2/2017 | Chen | G06F 21/552 |
| 2017/0046679 A1* | 2/2017 | Gotlieb | G06Q 20/34 |
| 2017/0053283 A1* | 2/2017 | Meng | G06Q 20/102 |
| 2017/0055146 A1* | 2/2017 | Ko | H04W 12/06 |
| 2017/0061428 A1* | 3/2017 | Prabhu | G06Q 50/01 |
| 2017/0063840 A1* | 3/2017 | Krishnaiah | G06Q 20/4014 |
| 2017/0063912 A1* | 3/2017 | Muddu | G06V 10/225 |
| 2017/0066459 A1* | 3/2017 | Singh | G06F 18/2431 |
| 2017/0078322 A1* | 3/2017 | Seiver | H04W 84/005 |
| 2017/0093905 A1* | 3/2017 | Ng | G06Q 40/06 |
| 2017/0099311 A1* | 4/2017 | Kesin | H04L 67/535 |
| 2017/0132866 A1* | 5/2017 | Kuklinski | G07D 7/2083 |
| 2017/0148021 A1* | 5/2017 | Goldstein | G06Q 20/027 |
| 2017/0149760 A1* | 5/2017 | Ryan | G06F 21/36 |
| 2017/0156246 P1* | 6/2017 | Maillard | A01H 5/08 Plt./195 |
| 2017/0161635 A1* | 6/2017 | Oono | G06N 3/084 |
| 2017/0161747 A1* | 6/2017 | Einhorn | G06Q 20/322 |
| 2017/0163677 A1* | 6/2017 | Gordon | G06F 16/24578 |
| 2017/0169434 A1* | 6/2017 | Maddocks | G06Q 20/4012 |
| 2017/0169508 A1* | 6/2017 | Song | G06Q 20/223 |
| 2017/0187709 A1* | 6/2017 | Rotem | G06F 21/31 |
| 2017/0199912 A1* | 7/2017 | Su | G06F 16/26 |
| 2017/0221066 A1* | 8/2017 | Ledford | G06Q 20/4016 |
| 2017/0223005 A1* | 8/2017 | Birgisson | H04L 63/083 |
| 2017/0228635 A1* | 8/2017 | Diev | G06N 3/08 |
| 2017/0250979 A1* | 8/2017 | Benson | H04L 63/08 |
| 2017/0265076 A1* | 9/2017 | Richards | G06Q 20/3223 |
| 2017/0295155 A1* | 10/2017 | Wong | H04L 67/306 |
| 2017/0300909 A1* | 10/2017 | Bansal | G06Q 20/3823 |
| 2017/0339180 A1* | 11/2017 | Klein | G06F 21/57 |
| 2018/0005230 A1* | 1/2018 | Zovi | G06Q 20/3823 |
| 2018/0005243 A1* | 1/2018 | Zovi | G06Q 20/405 |
| 2018/0007059 A1* | 1/2018 | Innes | G06F 21/6218 |
| 2018/0012227 A1* | 1/2018 | Tunnell | G06Q 20/40145 |
| 2018/0018704 A1* | 1/2018 | Tunnell | G06Q 30/0269 |
| 2018/0018723 A1* | 1/2018 | Nagla | H04L 63/08 |
| 2018/0020024 A1* | 1/2018 | Chao | H04L 63/1425 |
| 2018/0027006 A1* | 1/2018 | Zimmermann | G06F 21/6218 726/11 |
| 2018/0041533 A1* | 2/2018 | Chesla | G06F 16/24578 |
| 2018/0052981 A1* | 2/2018 | Nygate | G06N 20/00 |
| 2018/0052995 A1* | 2/2018 | Wu | G06F 21/566 |
| 2018/0053157 A1* | 2/2018 | Roffey | G06K 19/06206 |
| 2018/0068290 A1* | 3/2018 | Xia | G06Q 20/3276 |
| 2018/0069882 A1* | 3/2018 | Vescio | G06Q 10/0635 |
| 2018/0074484 A1* | 3/2018 | Heilmann | G05B 23/0248 |
| 2018/0075527 A1* | 3/2018 | Nagla | G06F 21/6218 |
| 2018/0139235 A1* | 5/2018 | Desai | H04L 63/1483 |
| 2018/0153066 P1* | 5/2018 | Maillard | A01H 6/7454 Plt./188 |
| 2018/0153067 P1* | 5/2018 | Maillard | A01H 5/08 Plt./188 |
| 2018/0153068 P1* | 5/2018 | Maillard | A01H 6/7454 Plt./188 |
| 2018/0153069 P1* | 5/2018 | Maillard | A01H 6/7454 Plt./188 |
| 2018/0153070 P1* | 5/2018 | Maillard | A01H 5/08 Plt./188 |
| 2018/0153071 P1* | 5/2018 | Maillard | A01H 5/08 Plt./195 |
| 2018/0153072 P1* | 5/2018 | Maillard | A01H 5/08 Plt./195 |
| 2018/0167402 A1* | 6/2018 | Scheidler | G06N 20/00 |
| 2018/0183827 A1* | 6/2018 | Zorlular | H04L 63/1416 |
| 2018/0189583 A1* | 7/2018 | Wohlken | H04W 12/06 |
| 2018/0196899 A1* | 7/2018 | Crabtree | G06F 8/10 |
| 2018/0198841 A1* | 7/2018 | Chmielewski | G08B 25/08 |
| 2018/0218265 A1* | 8/2018 | Diaz Caceres | G06N 5/02 |
| 2018/0248895 A1* | 8/2018 | Watson | H04L 63/083 |
| 2018/0268408 A1* | 9/2018 | Botros | G06Q 20/356 |
| 2018/0285549 A1* | 10/2018 | Sonkar | G06Q 20/40145 |
| 2018/0343246 A1* | 11/2018 | Benayed | H04L 9/3226 |
| 2019/0034660 A1* | 1/2019 | Ford | G06F 21/552 |
| 2019/0034924 A1* | 1/2019 | Prabhu | G06Q 20/3821 |
| 2019/0056983 A1* | 2/2019 | Jeong | G06F 11/0775 |
| 2019/0065596 A1* | 2/2019 | Meron | G06Q 20/10 |
| 2019/0075168 A1* | 3/2019 | Goldfarb | H04L 63/0272 |
| 2019/0098032 A1* | 3/2019 | Murphey | G06F 9/4498 |
| 2019/0122209 A1* | 4/2019 | Shah | G06Q 20/405 |
| 2019/0132134 A1* | 5/2019 | Noe | H04W 12/08 |
| 2019/0147376 A1* | 5/2019 | Mahabir | G06Q 10/0635 705/7.28 |
| 2019/0159388 P1* | 5/2019 | Maillard | A01H 6/7454 Plt./188 |
| 2019/0159389 P1* | 5/2019 | Maillard | A01H 6/7454 Plt./188 |
| 2019/0188218 A1* | 6/2019 | Harris | G06N 20/00 |
| 2019/0197616 A1* | 6/2019 | Dogin | G06Q 20/4016 |
| 2019/0205806 A1* | 7/2019 | Karmakar | G06Q 30/02 |
| 2019/0205823 A1* | 7/2019 | Karmakar | G06Q 10/087 |
| 2019/0205885 A1* | 7/2019 | Lim | G06F 16/9566 |
| 2019/0207953 A1* | 7/2019 | Klawe | G07F 7/088 |
| 2019/0207975 A1* | 7/2019 | Wardman | H04L 63/1483 |
| 2019/0208012 A1* | 7/2019 | Ying | G06F 16/16 |
| 2019/0258953 A1* | 8/2019 | Lang | G06N 3/08 |
| 2019/0270457 A1* | 9/2019 | Chen | B60W 40/09 |
| 2019/0293440 A1* | 9/2019 | Hasemann | G01C 21/3641 |
| 2019/0303728 A1* | 10/2019 | Zheng | G06Q 20/4016 |
| 2019/0318421 A1* | 10/2019 | Lyonnet | G06N 20/20 |
| 2020/0004598 A1* | 1/2020 | Brebner | G06F 9/5055 |
| 2020/0004759 A1* | 1/2020 | Brebner | G06F 8/10 |
| 2020/0005523 A1* | 1/2020 | Brebner | H04B 17/318 |
| 2020/0007556 A1* | 1/2020 | Brebner | G06F 16/958 |
| 2020/0007615 A1* | 1/2020 | Brebner | G06F 9/542 |
| 2020/0043006 A1* | 2/2020 | Ratnapu | G06Q 20/4016 |
| 2020/0050901 A1* | 2/2020 | Kirchner | G06F 18/28 |
| 2020/0067861 A1* | 2/2020 | Leddy | G06F 21/6245 |
| 2020/0178436 P1* | 6/2020 | Maillard | A01H 6/7454 Plt./188 |
| 2020/0178437 P1* | 6/2020 | Maillard | A01H 6/7454 Plt./188 |
| 2020/0178438 P1* | 6/2020 | Maillard | A01H 6/7454 Plt./188 |
| 2020/0178439 P1* | 6/2020 | Maillard | A01H 6/7454 Plt./188 |
| 2020/0178441 P1* | 6/2020 | Maillard | A01H 6/7463 Plt./194 |
| 2020/0178442 P1* | 6/2020 | Maillard | A01H 6/7463 Plt./194 |
| 2020/0183762 A1* | 6/2020 | Loredo | H04L 51/226 |
| 2020/0225673 A1* | 7/2020 | Ebrahimi Afrouzi | G05D 1/0044 |
| 2020/0285464 A1* | 9/2020 | Brebner | G06F 11/362 |
| 2020/0285788 A1* | 9/2020 | Brebner | G06F 18/2431 |
| 2020/0285855 A1* | 9/2020 | Brebner | G06V 10/96 |
| 2020/0285912 A1* | 9/2020 | Brebner | G06N 20/20 |
| 2020/0285936 A1* | 9/2020 | Sen | G06N 3/042 |
| 2020/0285977 A1* | 9/2020 | Brebner | H04W 4/33 |

(56) References Cited

U.S. PATENT DOCUMENTS

| | | | |
|---|---|---|---|
| 2020/0293684 A1* | 9/2020 | Harris | H04W 12/02 |
| 2020/0349283 A1* | 11/2020 | Saket | G06F 21/6254 |
| 2020/0349284 A1* | 11/2020 | Saket | G06F 21/64 |
| 2020/0390399 A1* | 12/2020 | Fee | G16H 50/20 |
| 2021/0027182 A1* | 1/2021 | Harris | G06N 20/20 |
| 2021/0074160 A1* | 3/2021 | Skipp | G08G 1/0112 |
| 2021/0089040 A1* | 3/2021 | Ebrahimi Afrouzi | G05D 1/0248 |
| 2021/0112068 A1* | 4/2021 | Harris | H04L 63/104 |
| 2021/0112090 A1* | 4/2021 | Rivera | H04L 63/1441 |
| 2021/0176262 A1* | 6/2021 | Harris | G06Q 20/4016 |
| 2021/0209505 A1* | 7/2021 | Crabtree | G06Q 10/04 |
| 2021/0234848 A1* | 7/2021 | Harris | H04W 12/67 |
| 2021/0241149 A1* | 8/2021 | Carlson | G06N 5/043 |
| 2021/0264448 A1* | 8/2021 | Harris | G06Q 30/0201 |
| 2021/0297839 A1* | 9/2021 | Oba | H04W 4/90 |
| 2021/0357507 A1* | 11/2021 | Sulatycki | G06F 9/541 |
| 2021/0406368 A1* | 12/2021 | Agranonik | G06F 21/56 |
| 2022/0004683 A1* | 1/2022 | Crabtree | G06F 8/10 |
| 2022/0014560 A1* | 1/2022 | Crabtree | H04L 63/1433 |
| 2022/0032454 A1* | 2/2022 | Yang | G06V 20/64 |
| 2022/0036200 A1* | 2/2022 | Ma | G06N 20/20 |
| 2022/0051108 A1* | 2/2022 | Harris | G06N 20/00 |
| 2022/0057519 A1* | 2/2022 | Goldstein | G01S 17/04 |
| 2022/0058323 A1* | 2/2022 | Heilmann | G05B 23/0248 |
| 2022/0060498 A1* | 2/2022 | Head, Jr. | H04L 12/4633 |
| 2022/0066456 A1* | 3/2022 | Ebrahimi Afrouzi | B25J 9/1697 |
| 2022/0076252 A1* | 3/2022 | Prabhu | H04W 12/068 |
| 2022/0112576 A1* | 4/2022 | Xia | C22B 59/00 |
| 2022/0131897 A1* | 4/2022 | Vangaveti | H04L 63/145 |
| 2022/0174853 P1* | 6/2022 | Maillard | Plt./190 |
| 2022/0203218 A1* | 6/2022 | Dym | A63F 9/0641 |
| 2022/0203219 A1* | 6/2022 | Dym | A63F 9/0669 |
| 2022/0269954 A1* | 8/2022 | Harris | G06N 5/022 |
| 2022/0277240 A1* | 9/2022 | Nuernberger | A01G 23/00 |
| 2022/0318641 A1* | 10/2022 | Carreira-Perpiñán | G06N 20/20 |
| 2023/0014548 A1* | 1/2023 | Podvent | G16H 40/63 |

OTHER PUBLICATIONS

Coelho et al "OLBS: Offline Location Based Services," 2011 Fifth International Conference on Next Generation Mobile Applications and Services, pp. 70-75 (Year: 2011).*

Gonzalez-Perez "A Metamodel for the Behavior Trees Modeling Technique," Proceedings of the Third International Conference on Information Technology and Applications, IEEE Computer Society, pp. 1-5 (Year: 2005).*

("Kumar," "Delegation-Based Robust Authentication Model for Wireless Roaming Using Portable Communication Devices," IEEE Transactions on Consumer Electronics, vol. 60, No. 4, Nov. 2014, pp. 668-674) (Year: 2014).*

Aggelis "Offline Internet Banking Fraud Detection," Proceedings of the First International Conference on Availability, Reliability and Security (ARES '06), pp. 1-2 (Year: 2006).*

Giguere "Mobile Data Management: Challenges of Wireless and Offline Data Access," IEEE, pp. 227-228 (Year: 2001).*

Jayasinghe et al "Extending EMV Tokenized Payments to Offline-Environments," IEEE Computer Society, pp. 443-450 (Year: 2016).*

Faraji et al "Identity Access Management for Multi-Tier Cloud Infrastructures," IEEE, pp. 1-9 (Year: 2014).*

Corner et al "Zero-Interaction Authentication," Mobicom'02, ACM, pp. 1-11, (Year: 2002).*

PCT/US2018/013396, "International Search Report and Written Opinion", dated Oct. 16, 2018, 12 pages.

* cited by examiner

OFFLINE AUTHORIZATION OF INTERACTIONS AND CONTROLLED TASKS

CROSS-REFERENCES TO RELATED APPLICATIONS

This application is a U.S. National Phase of PCT Application No. PCT/US2018/013396, filed Jan. 11, 2018, the disclosure of which is incorporated by reference.

BACKGROUND

Users rely on their mobile phones to perform a variety of tasks including taking and sharing photos, receiving news updates, engaging in mobile banking, conducting payments, etc. Typically, these tasks and interactions take place in an online environment, where the mobile device is connected to the Internet using a cellular data or WiFi connection. Sometimes users interact with their mobile phones in an offline setting. This may be due to a lack of network coverage, or possibly, a desire to prevent private data from being widely shared over the Internet.

The processing of mobile services and interactions is usually maintained centrally by online service providers, which can guarantee the security and legitimacy of its services to its users. For example, payments made using a mobile payment application may typically rely on a centralized server for authorizing and/or validating transactions. When a mobile phone is offline, the availability of necessary services such as authorization of payments may be non-existent.

Embodiments of the invention described herein address these and other problems, individually and collectively.

BRIEF SUMMARY

Embodiments provide systems, apparatus, and methods for securely authorizing offline interactions.

One embodiment of the invention includes a method comprising: receiving, by a first communication device, a first local authentication model, the first local authentication model being derived from a master authentication model at a remote server computer; receiving, by the first communication device, a request to perform an interaction with a second communication device, the interaction being performed in an offline manner; applying, by the first communication device, the first local authentication model to the interaction to determine a first authentication result; determining, by the first communication device, whether or not to allow the interaction to proceed based upon the first authentication result; and updating, by the first communication device, the first local authentication model using the master authentication model when the first communication device is online.

Another embodiment of the invention includes a communication device configured to perform the above method.

Another embodiment of the invention includes a method comprising receiving, by a server computer, data for a plurality of requests to perform a plurality of interactions generated at a plurality of communication devices; generating, by the server computer, a master authentication model based on the data for the plurality of requests to perform the plurality of interactions; deriving, by the server computer, one or more local authentication models from the master authentication model; and distributing, by the server computer, the one or more local authentication models to one or more communication devices, wherein the one or more communication devices apply one or more requests to perform one or more offline interactions to the one or more local authentication models to determine an authentication result for the one or more requests.

Another embodiment of the invention includes a server computer configured to perform the above method.

A better understanding of the nature and advantages of the present invention may be gained with reference to the following detailed description and the accompanying drawings.

TERMS

Figure 1:
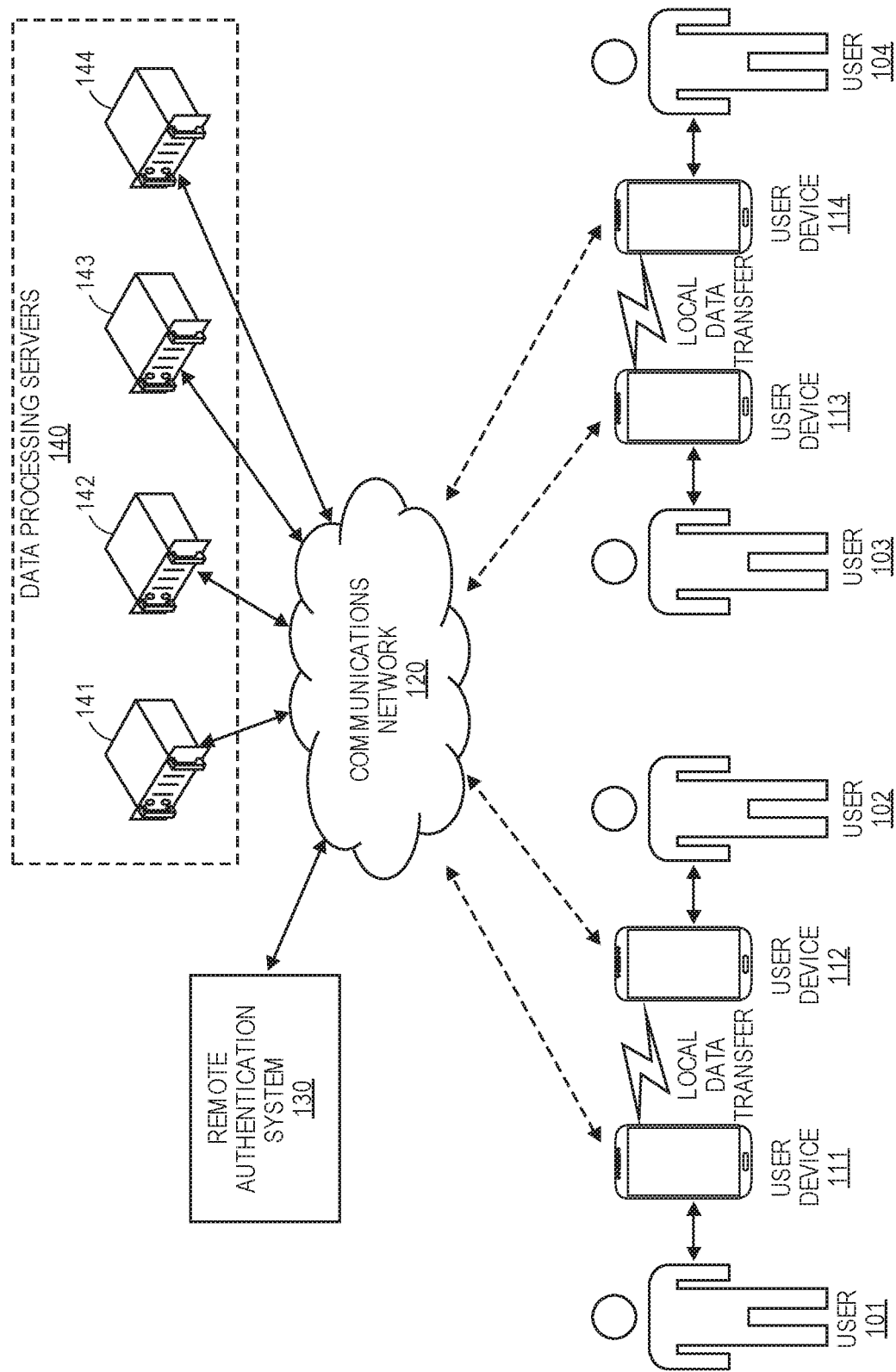
FIG. 1 shows an illustration of a system comprising computing devices for secure authorization of interactions according to embodiments.

Prior to discussing embodiments of the invention, descriptions of some terms may be helpful in understanding embodiments of the invention.

A "credential" may be any suitable information that serves as reliable evidence of worth, ownership, identity, or authority. A credential may be a string of numbers, letters, or any other suitable characters, as well as any object or document that can serve as confirmation. Examples of credentials include value credentials, identification cards, certified documents, access cards, passcodes and other login information, etc.

An "application" may be computer code or other data stored on a computer readable medium (e.g. memory element or secure element) that may be executable by a processor to complete a task.

An "application programing interface" or "API" may be a software intermediary that allows two separate applications, devices, or entities to communicate. This can include a set of routines, protocols, and tools for building said applications, so as to specify how different software components should interact.

A "risk model" may be a predictive model for determining the riskiness of current actions based on a history of previous actions. This may include comparing new data to old data that has been labeled as risky. Risk models used for the purpose of authenticating a user can also be referred to as "authentication models."

A "master authentication model" can be an authentication model that is used as a main authentication model for which other authentication models can reference or be updated with. For example, the master authentication model can be maintained by a service provider that provides updates to devices. In this manner, a master authentication model may be considered to be the most up to date or most accurate. A master authentication module can take into account data with respect to a large variety of users, devices, and circumstances.

A "local authentication model" can be an authentication model that exists on a user device. For example, the local authentication model can be a portion of a master authentication model or a master authentication model that has been reduced to a smaller file size. A location authentication model can include or be formed from data that is specifically associated with the user device, the circumstances (e.g., location) surrounding the user device, or the user and circumstances surrounding the user.

An "authentication result" can be a determination that something or someone is or is likely to be authentic. For example, an authentication result may be a decision that a user is genuinely who he or she says he or she is. For example, an authentication result can be positive if a user's identity is confirmed, while an authentication result can be negative if a user cannot be correctly identified.

The term "online" may refer to a state in which a device is connected over interconnected networks, such as through the Internet. In such a manner, the device is able to receive and send data globally across connections. The term "offline" may refer to any state in which a device is not online.

An "authorization request message" may be an electronic message that requests authorization for an interaction. An authorization request message according to some embodiments may comply with ISO 8583, which is a standard for systems that exchange electronic interaction information associated with a user using an issued user account. The authorization request message may include an issuer account identifier that may be associated with the user's account. An authorization request message can also comprise additional data elements corresponding to "identification information" including, by way of example only: a service code, a CVV (card verification value), a primary account number (PAN), a token, a user name, an expiration date, etc. An authorization request message may also comprise "interaction information," such as any information associated with a current interaction, such as an interaction location, transaction amount, resource provider identifier, resource provider location, bank identification number (BIN), merchant category code (MCC), information identifying resources being provided/exchanged, etc., as well as any other information that may be utilized in determining whether to identify and/or authorize an interaction.

An "authorization response message" may be a message that responds to an authorization request. The authorization response message may include, by way of example only, one or more of the following status indicators: Approval—transaction was approved; Decline—transaction was not approved; or Call Center—response pending more information, merchant calls the toll-free authorization phone number. The authorization response message may also include an authorization code. The code may serve as proof of authorization for an interaction.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "user device" may be a device that is operated by a user. Examples of user devices may include a mobile phone, a smart phone, a personal digital assistant (PDA), a laptop computer, a desktop computer, a server computer, a vehicle such as an automobile, a thin-client device, a tablet PC, etc. Additionally, user devices may be any type of wearable technology device, such as a watch, earpiece, glasses, etc. The user device may include one or more processors capable of processing user input. The user device may also include one or more input sensors for receiving user input. As is known in the art, there are a variety of input sensors capable of detecting user input, such as accelerometers, cameras, microphones, etc. The user input obtained by the input sensors may be from a variety of data input types, including, but not limited to, audio data, visual data, or biometric data. The user device may comprise any electronic device that may be operated by a user, which may also provide remote communication capabilities to a network. In such instances, the user device can be referred to as a "communication device." Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network.

A "graphics processing unit" or "CPU" may refer to an electronic circuit designed for the creation of images intended for output to a display device. The display device may be a screen, and the GPU may accelerate the creation of images in a frame buffer by rapidly manipulating and altering memory. GPUs may be have a parallel structure that make them more efficient than general-purpose CPUs for algorithms where the processing of large blocks of data is done in parallel. Examples of GPUs may include Radeon™ HD 6000 Series, Polaris™ 11, NVIDIA GeForce™ 900 Series, NVIDIA Pascal™, etc.

The term "artificial intelligence model" or "AI model" may refer to a model that may be used to predict outcomes in order achieve a target goal. The AI model may be developed using a learning algorithm, in which training data is classified based on known or inferred patterns. One type of AI model may be a "machine learning model."

"Machine learning" may refer to an artificial intelligence process in which software applications may be trained to make accurate predictions through learning. The predictions can be generated by applying input data to a predictive model formed from performing statistical analysis on aggregated data. Machine learning that involves learning patterns from a topological graph can be referred to as "graph learning."

A "topological graph" may refer to a representation of a graph in a plane of distinct vertices connected by edges. The distinct vertices in a topological graph may be referred to as "nodes," Each node may represent specific information for an event or may represent specific information for a profile of an entity or object. The nodes may be related to one another by a set of edges, E. An "edge" may be described as an unordered pair composed of two nodes as a subset of the graph G=(V, E), where is G is a graph comprising a set V of vertices (nodes) connected by a set of edges E. For example, a topological graph may represent a transaction network in which a node representing a transaction may be connected by edges to one or more nodes that are related to the transaction, such as nodes representing information of a device, a user, a transaction type, etc. An edge may be associated with a numerical value, referred to as a "weight", that may be assigned to the pairwise connection between the two nodes. The edge weight may be identified as a strength of connectivity between two nodes and/or may be related to a cost or distance, as it often represents a quantity that is required to move from one node to the next.

A "feature" may refer to a specific set of data to be used in training a machine learning model. An input feature may be data that is compiled and expressed in a form that may be accepted and used to train an artificial intelligence model as useful information for making predictions. In some embodiments, an input feature may be identified as a collection of one or more input nodes in a graph, such as a path comprising the input nodes.

A "subgraph" or "sub-graph" may refer to a graph formed from a subset of elements of a larger graph. The elements may include vertices and connecting edges, and the subset may be a set of nodes and edges selected amongst the entire set of nodes and edges for the larger graph. For example, a plurality of subgraph can be formed by randomly sampling graph data, wherein each of the random samples can be a subgraph. Each subgraph can overlap another subgraph formed from the same larger graph.

A "community" may refer to a group/collection of nodes in a graph that are densely connected within the group. A community may be a subgraph or a portion/derivative thereof and a subgraph may or may not be a community and/or comprise one or more communities. A community may be identified from a graph using a graph learning algorithm, such as a graph learning algorithm for mapping protein complexes. Communities identified using historical data can be used to classify new data for making predictions. For example, identifying communities can be used as part of a machine learning process, in which predictions about information elements can be made based on their relation to one another.

A "data set" may refer to a collection of related sets of information composed of separate elements that can be manipulated as a unit by a computer. A data set may comprise known data, which may be seen as past data or "historical data." Data that is yet to be collected or labeled, may be referred to as future data or "unknown data." When future data is received at a later point it time and recorded, it can be referred to as "new known data" or "recently known" data, and can be combined with initial known data to form a larger history.

"Unsupervised learning" may refer to a type of learning algorithm used to classify information in a dataset by labeling inputs and/or groups of inputs. One method of unsupervised learning can be cluster analysis, which can be used to find hidden patterns or grouping in data. The clusters may be modeled using a measure of similarity, which can defined using one or metrics, such as Euclidean distance.

An "interaction" may be a reciprocal action that involves more than one actor. For example, an interaction between devices can include the exchange of data. As another example, interactions between consumers and merchants can be referred to as "transactions."

DETAILED DESCRIPTION

Embodiments described herein are directed to secure device interactions, authentication, and offline authorization.

As previously explained, users may wish to interact with each other and exchange data between devices in an offline setting and in a secure manner. However, the exchange of data between devices and the processing of such data in the devices was generally allowed to proceed without any restrictions. Embodiments provide for methods, devices, and systems that allow for offline analysis of user device data by local devices. The local devices can conduct risk analyses and can control access to applications and functions, and data processing according to models that can be updated on a continual basis by a master analytical model on a remote server computer. As such, an interaction between two devices and the processing of data by those devices can be controlled with up to date control logic, despite the inability of those devices to connect online to the remote server computer during the desired interaction.

FIG. 1 shows an illustration of computing devices for secure authorization of interactions according to embodiments. In embodiments, a plurality of users, such as user 101, 102, 103, 104, etc. may each possess a user device 111, 112, 113, 114. Each user device 111, 112, 113, 114 can be a mobile device, such as a mobile phone, laptop, smart watch or other wearable device, etc.

Each user 101, 102, 103, 104 may connect over to communications network 120 using the network communication interface in their user device 111, 112, 113, 114. For example, each user device 111, 112, 113, 114 may use cellular data or WiFi to connect to the Internet. Through the communications network 120, each user device 111, 112, 113, 114 may establish communications with one or more remote server computers, so as to access a desired function or service provided by the one or more remote server computers. This may include server computers in the remote authentication system 130 and data processing servers 140.

Remote authentication system 130 may include one or more computers (e.g., server computers) operatively coupled together, where one or more of the computers performs different functions in a secure authentication implementation. For example, remote authentication system 130 may comprise a plurality of server computers configured to process authentication requests and/or perform message routing to one or more authentication service providers. In one embodiment, remote authentication system 130 may be a centralized point of communication between user devices and data processing servers 140. In the embodiment, the computers of remote authentication system 130 may comprise interfaces for handling requests/responses of varying formats between said user devices and data processing servers. For example, a request comprising a biometric template associated with the user to securely authenticate user 101 from user device 111 can be transmitted to remote authentication system 130. The remote authentication system 130 may then reformat the request for transmission to a biometric verification service provided by data processing server 141. A response can then be received by remote authentication system 130 from data processing server 141 and forwarded to user device 111 to deliver an authentication result.

Data processing servers 140 may include a plurality of server computers (e.g. data processing server 141, 142, 143, 144, etc.), which may each be capable of processing data relating to authentication/authorization of actions undertaken by users on their user devices. Each data processing server may be configured to perform a specialized function or type of authentication. For example, data processing server 141 may be a biometric verification server that verifies biometric data of a user. Meanwhile, data processing server 142 may be a risk scoring server that evaluates the riskiness of interactions based on known occurrences of fraud (e.g. evaluating an interaction as risky if it involves a device reported as stolen). In an embodiment, remote authentication system 130 may utilize one or more functions/services provided by data processing servers 140 to evaluate interactions for authorization purposes, and may be configured to route messages to the appropriate data processing server to perform each function.

In embodiments, users may be capable of interacting and transferring data between user devices locally in an offline manner. For example, user 101 may use a local area network or a Bluetooth™ capability of user device 111 to interact with user 102 and exchange data with user device 112. Similarly, user 103 may use a Bluetooth™ capability of user device 113 to interact with user 104 and exchange data with user device 114. The interactions can be, for example, the transfer of contact information, image files, video files, music files, documents, digital currency, etc. For example, an interaction may involve user 101 transferring cryptocurrency stored/maintained at an application of user device 111 to user 102, such that user 102 may access the cryptocurrency through a similar application stored at user device 112 and use the associated funds to conduct purchases thereafter.

Figure 2:
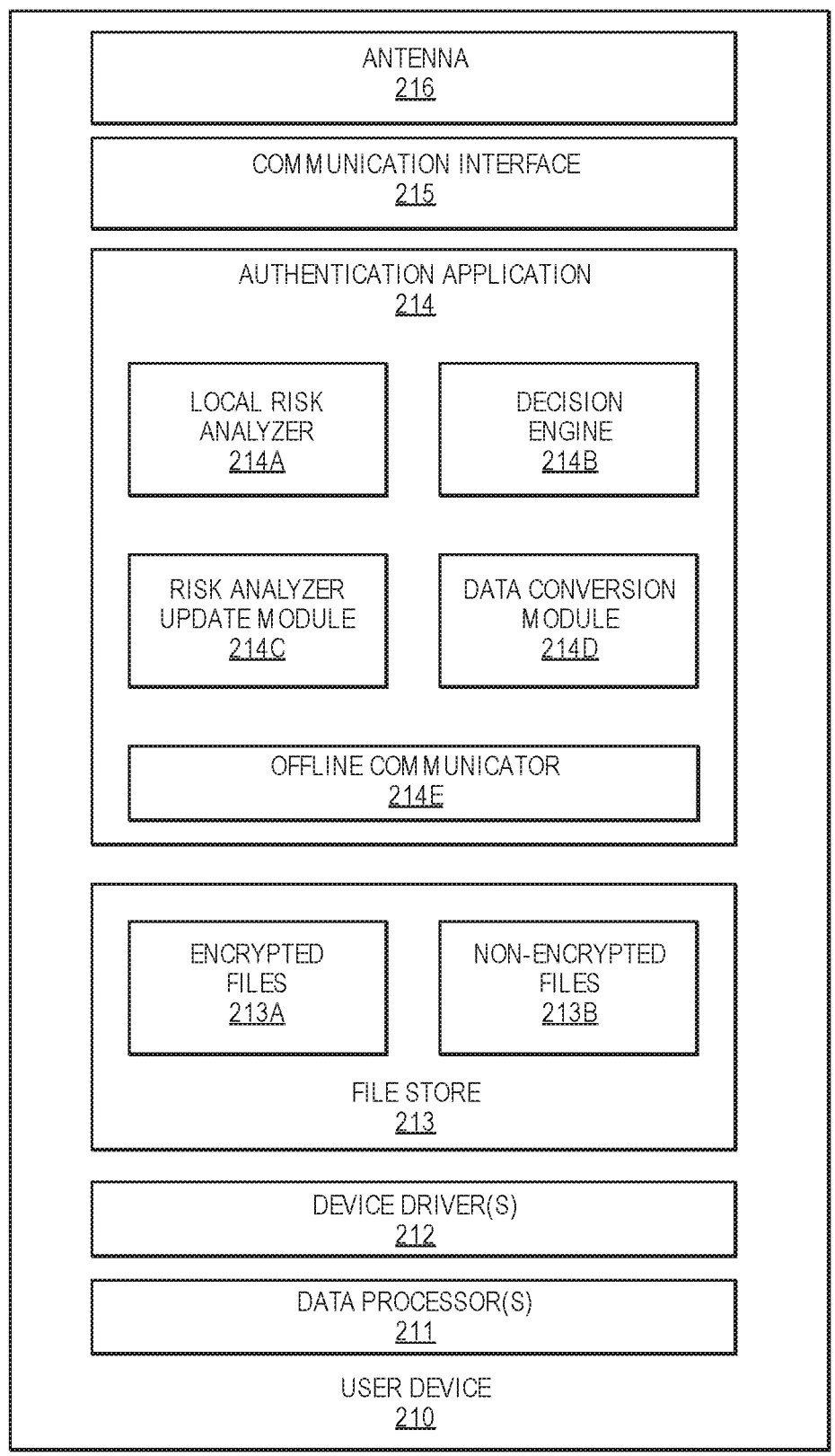
FIG. 2 shows a block diagram of an exemplary user device (e.g., a communication device) according to an embodiment.

FIG. 2 shows a block diagram of an exemplary user device according to an embodiment of the invention. The user device 210 can be any suitable computing device, such as a mobile device, wearable device, personal computer, and/or Internet of things or "IOT" device. An exemplary user device can include user device 111, 112, 113, and/or 114 operated by user 101, 102, 103, and 104 of FIG. 1 respectively.

User device 210 may comprise a data processor(s) 211 for processing electronic instructions as information. For example, the data processor can include any number of central processing units (CPUs) and/or graphics processing units (GPUs). Data processor(s) 211 may be configured to execute instructions stored in a computer-readable medium, such as from an internal and/or external memory.

User device 210 may additionally comprise device driver (s) 212. Device driver(s) 210 may include software for translating data messages into a form that hardware elements coupled to user device 210 can understand. For example, device driver(s) 210 may interpret input/output instructions of an operating system of user device 210 as tasks that can be performed by a screen and/or camera of user device 210, such as enabling the camera to take a picture and display it to a user of the device.

User device 210 may further comprise file store 213. File store 213 may comprise a portion of memory in which device data can be stored. This may include encrypted files 213A and non-encrypted files 213B. For example, file store may comprise a store of encrypted messages and passwords for the user of user device 210 as well as a non-encrypted cache of device operational data such as memory usage, CPU usage, application install/uninstall history, etc.

User device 210 may also comprise authentication application 214. Authentication application 214 can include software stored in a memory of user device 210 that allows for secure authentication and authorization of device operations and interactions. The authentication application 214 may comprise a number of modules including local risk analyzer 214A, decision engine 214B, risk analyzer update module 214C, data conversion module 214D, and offline communicator 214E.

Local risk analyzer 214A may comprise computer-readable instructions for analyzing device data and applying the data to a locally stored risk model. In one embodiment, local risk analyzer 214A may comprise instructions for detecting one or more anomalies associated with an interaction. The local risk analyzer 214A (e.g., in conjunction with the data processor(s) 211) may compare collected device information to an event history and/or a cache history of recorded command sequences. For example, local risk analyzer 214A may determine that a request is associated with an abnormally high rate of CPU usage, memory usage, or other device behavior that may deviate from values expected based on previously recorded data. Other examples of collected device information from which an anomaly can be observed from may include a device location, a history of connected devices, network connection history, a last update timestamp, activity since the last update, a last device reboot timestamp, and/or a last device recharge timestamp.

The detection of an anomaly may initiate a risk analysis process for determining a risk score for the interaction. For example, an interaction relating to a data transfer of a music file to user device 210 from an unknown device may involve an unknown device that has not received the latest software update for conducting interactions. The absence of the latest update on the unknown device may trigger local risk analyzer 214A to initiate the risk analysis process, which may comprise applying information for the data transfer to a locally stored learning model that is trained for identifying potential computer viruses. The learning model may obtain and analyze the information for the data transfer (e.g. file size, device location, etc.) and may then determine a risk score quantifying the probability that the music file is actually a malicious program. Decision engine 214B may comprise instructions for evaluating incoming data and determining an appropriate response and/or action. In one embodiment, decision engine 214B may comprise a behavior tree. The behavior tree may include various actions that can be queried based on the analyzed risk of incoming data. For example, the behavior tree may comprise an action of 'restrict offline access' for interaction data that has received a risk score of 90 or higher (i.e. high risk interaction).

Risk analyzer update module 214C may comprise instructions for synchronizing a local risk model with information of a master authentication model maintained by a remote authentication system. The master authentication model may comprise new information relating to recent data that has been collected from other devices in a network, and the new information may allow for more accurate risk modeling and identification of fraud. For example, user device 210 may lose network coverage during a period of time in which a fraudulent actor has interacted frequently in the network. Fraudulent activity performed by the actor may be logged and identified by the remote authentication system and expressed in the master authentication model so that the master authentication model is up to date. When the user device 210 regains network connectivity, the local risk model may be updated to account for the recent fraudulent activity.

The remote authentication system may comprise a processor, and a computer readable medium coupled to the processor. The computer readable medium may comprise code, executable by the processor for receiving data for a plurality of requests to perform a plurality of interactions generated at a plurality of communication devices; generating a master authentication model based on the data for the plurality of requests to perform the plurality of interactions; deriving one or more local authentication models from the master authentication model; and distributing the one or more local authentication models to one or more communication devices, wherein the one or more communication devices apply one or more requests to perform one or more offline interactions to the one or more local authentication models to determine an authentication result for the one or more requests.

As a more specific illustration, the local risk analyzer 214A may have been updated by the master authentication model at time T1 when the user device 210 is online and capable of communicating with the remote authentication system. At time T2, the user device 210 may be offline, and at T3, the user device 210 may attempt to interact with another user device to conduct an interaction. At time T4, the user device 210 may retain connectivity with the remote authentication system and may be updated with updated data from the master authentication model at the remote authentication system. Between T1 and T4, the master authentication model may be updated with other transaction data, and the local risk analyzer 214A may not be updated with this information. For example, prior to T2, the local risk analyzer 214A may have taken into account that five potentially fraudulent transactions have been conducted by other user devices in the vicinity of the user device 210. Between T1 and T4, the remote authentication system may be notified that two additional potential fraudulent transaction have been conducted by user devices in the vicinity of the user device 210. The local risk analyzer 214A may not have taken this information into account when analyzing the interaction at T3, but it may nonetheless be sufficient to make an accurate determination as to whether the user device 210 should or should not proceed with the proposed interaction at T3. When the user device 210 is back online, the local risk analyzer 214A may be updated to account for the information regarding the two additional potentially fraudulent transactions. In addition, the master authentication model may be updated with information from the local interaction between the user device 210 and the other device involved in the local interaction.

Data conversion module 214D may comprise instructions for converting data values into a different form. In one embodiment, data conversion module 214D may comprise instructions for performing a data encryption method. For example, the data conversion module 214D may comprise instructions for encrypting device information in a manner that allows for secure multi-party computation, such as obfuscating clear text values according to Yao's garbled circuit or other suitable garbled circuit protocol.

Offline communicator 214E may comprise instructions for receiving offline requests and delivering offline responses between interacting devices. For example, the offline communicator 214E may comprise code for generating Bluetooth™ messages (e.g., classic and BLE—Bluetooth™ Low Energy), and broadcasting Bluetooth™ messages to nearby devices. Offline communicator 214E may comprise instructions for exchanging data through any suitable offline communication means, such as through near-field communications, RFID, SS7 signaling, etc.

Furthermore, user device 210 may comprise communication interface(s) 215 for formatting and reformatting data messages. As such, user device 210 may be capable of sending and receiving messages properly and successfully during an interaction and/or software update. For example, communication interface(s) 215 may comprise instructions for formatting an SMS text message or Internet protocol message that can be sent over antenna 216. As another example, communication interface(s) 215 may include instructions for pairing user device 210 with one or more nearby devices over Bluetooth.

User device 210 may comprise an antenna 216 for sending and receiving data messages wirelessly. For example, antenna 216 may be cellular antenna for connecting to a telecommunications network. Antenna 216 may be capable of sending and receiving data coverage by any available means, such as through 3G, 4G, 5G, LTE, WiFi, etc.

According to embodiments, a user device may be capable of conducting interactions, such as payment transactions and other data transfers. These interactions can be authorized online or offline, and may initiate an online or offline authentication process for identifying the user of the device and verify his or her credentials. For example, authentication may comprise verifying usernames, passwords, payment credentials as well as conducting appropriate risk scoring for identifying and preventing fraud.

Figure 3:
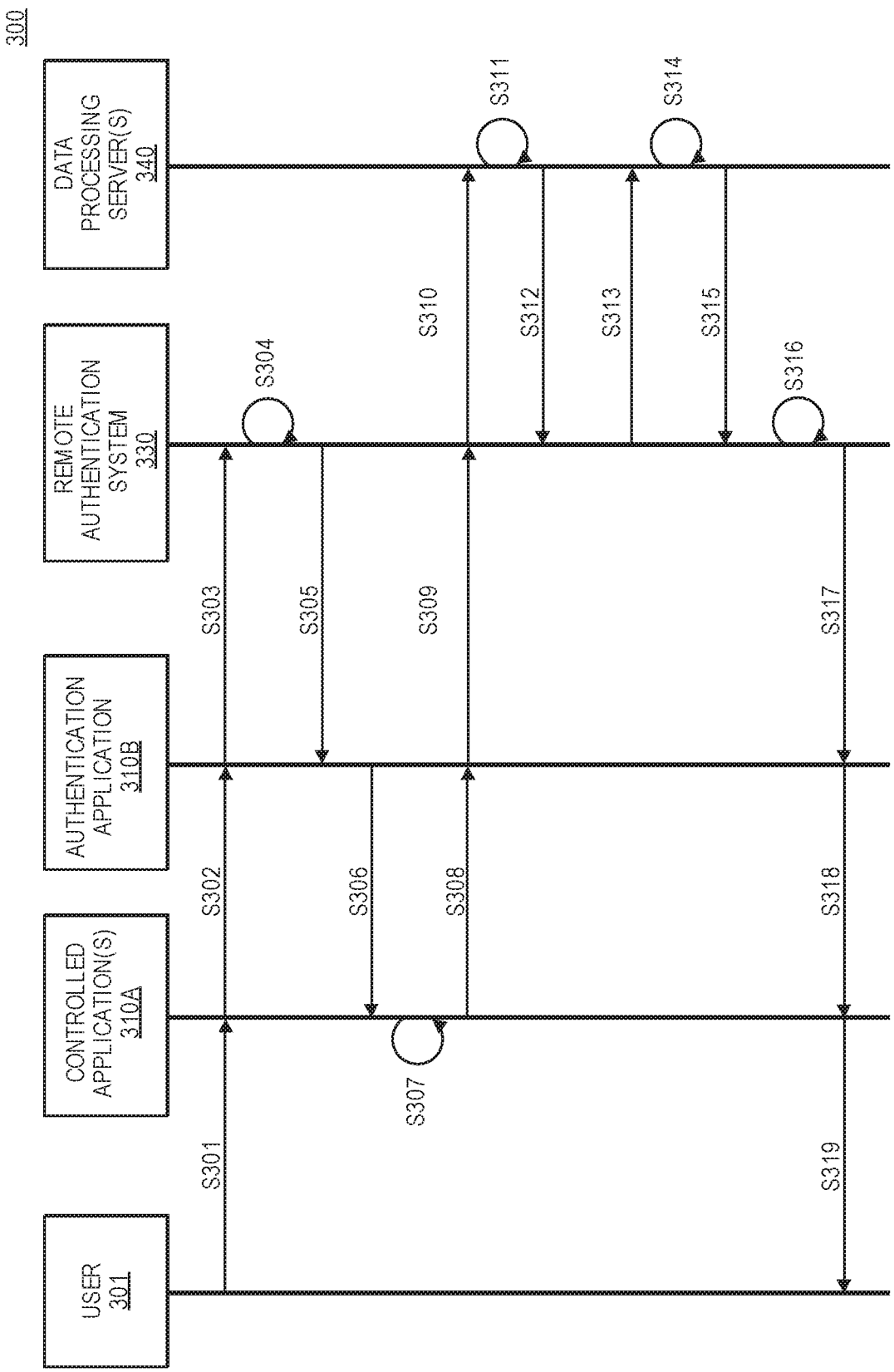
FIG. 3 shows a swim-lane diagram of an online authentication process for a device action according to an embodiment.

FIG. 3 shows a swim-lane diagram of an online authentication process for a device action according to an embodiment. Process 300 may involve a user 301 controlling a user device (not shown). An example of an exemplary user device may include user device 210 of FIG. 2, The user device may comprise controlled application(s) 310A and authentication application 310B. Process 300 may further utilize remote authentication system 330 and data processing server(s) 340, which may be similar to the remote authentication system 130 and data processing server(s) 140 of FIG. 1 respectively.

At step S301, user 301 initiates an action using controlled application 310A stored on his or her user device, Controlled application 310A may be any application for performing an action that requires secure authorization and/or authentication of the initiating users and/or user devices. For example, the controlled application 310A may be a mobile banking application, digital wallet application, cryptocurrency application, file sharing application, etc. The initiated action can be, for example, a login process into a personal account, a digital payment, the transfer of a file between devices, etc.

At step S302, controlled application 310 sends an authentication/authorization request to authentication application 310B. For example, a request to authenticate user 301 so that he or she can access his or her personal account associated with controlled application 310A (e.g. social media account, banking account, investment portfolio, etc.) may be generated. As another example, a request to authorize a transaction (e.g. a purchase at a merchant or a funds transfer with another user) can be generated by controlled application 310A may be generated and sent to authentication application 310B.

At step S303, the authentication application 310B sends an update request to remote authentication system 330. Upon receiving the authentication/authorization request in step S302, the authentication application 310B may then request an update from a remote server so as ensure that the authentication application 310B contains the latest information. For example, the authentication application 310B may contain a local risk model that may be updated with information of a master risk model containing more recent and more accurate risk analyses. In one embodiment, the update request may comprise device information collected since the last time authentication application 310B was updated. For example, the update request may comprise a last update timestamp, an uninstall/install history, a cache/history of activity in the controlled application, a network connectivity history, etc.

At step S304, remote authentication system 330 processes the update request. The remote authentication system 330 may receive the update request and may determine the necessary update and installation data that needs to be sent back to the authentication application 310B. For example, data for a local risk model stored at authentication application 310B may be compared to a master risk model stored at remote authentication system 330 to determine update data. In one embodiment, the remote authentication system may record device information received in the update request. For example, the remote authentication system may record the device location and network connection, which can then be used to provide additional data for risk analyses performed by the remote authentication system 330. Other external data such as transaction data associated with transactions not conducted by the user device or the user of the user device may be used to the remote authentication system 330 to update a master risk model.

At step S305, remote authentication system 330 sends an update to authentication application 310B. The update may comprise the update and installation data determined in step S304. In one embodiment, the update data may comprise graph data for a graph based learning model.

At step S306, authentication application 310B requests a scan from controlled application(s) 310A. The scan may be for device data of one or more devices involved in the requested action. For example, the action may involve a funds transfer between two devices, and the requested scan may be a request to scan both devices involved. As another example, the action may involve an adjustment of user settings and/or preferences stored at a device, and the scan may involve the device at which user settings/preferences are being adjusted. During the scan, data can be collected to update a master authentication model or local risk analyzer (which is an example of a local authentication model).

At step S307, controlled application(s) scans for device information of one or more devices involved in an interaction. In one embodiment, the scan may be performed using an API provided by an entity associated with authentication application 310B, For example, the scan may be included as part of the update provided to authentication application 310B in step S305.

The scan may comprise the collection of relevant information about the usage of the involved devices. For example, the relevant information may include the GPS coordinates of the devices, the level of usage of specific applications (e.g. amount of time spent on application/time with application open, amount of memory, and/or amount of CPU usage), and/or the time of day that an action is requested. In one embodiment, the collected device information may be related to features (e.g. risk features) learned by an artificial intelligence model to identify abnormal behavior. For example, a user device may initiate a transaction at night in a downtown area although the user device belongs to a user that typically transacts during the day in a suburban area, and thus the interaction may potentially be identified as abnormal based on the features of "time of day" and "location," In one embodiment, the artificial intelligence model may be a graph model or graph learning model comprising user communities. For example, each user community may be defined by features that identify typical behavior and actions of included users on their devices, and actions falling outside of those defining features may potentially be flagged as abnormal/risky. More information regarding using a graph model to identify user communities and characteristic user behavior can be found in international patent application No. PCT/US2017/041537, which is herein incorporated by reference in its entirety for all purposes.

At step S308, controlled application(s) sends the device information (and any other relevant information) to authentication application 310B. In one embodiment, authentication application 310B may encrypt the device information. The device information may be encrypted according to a method of secure multi-party computation, such as Yao's garbled circuit, or through standard encryption processes using symmetric or asymmetric encryption keys. The authentication application 310B may then format the device information as part of a data message that can be sent to remote authentication system 330.

At step S309, authentication application 310B receives the device information and forwards the authentication/authorization request including a request for a risk analysis of the device information to remote authentication system 330. The remote authentication system 330 may then receive the authentication/authorization request, and may determine what analyses are necessary for authenticating the involved devices and/or authorizing the requested action. For example, a server computer of remote authentication system 330 may determine that a requested transaction should be risk scored based on its location and purchase amount, and may further determine that the device identifiers for the involved devices should be compared to a negative list of reported stolen devices.

At step S310, remote authentication system 330 requests data processing from data processing server(s) 340. In one embodiment, various forms of authentication and analyses may be performed remotely by individual data processing servers specializing in each type of authentication/analysis (e.g. risk scoring, negative lists, user community group/user activity comparison, biometric verification, etc.). The remote authentication system 330 may call out to the particular data processing server over an established network, such that the data processing server may analyze the data and provide an evaluation that can be utilized by the remote authentication system 330 in making an authentication/authorization decision.

At step S311, data processing server(s) 340 processes first risk data. The first risk data may include device information of a particular type that a particular data processing server of data processing server(s) 340 is capable of analyzing. For example, the data processing server may determine a risk score based on a device location, a time of day, and a transaction amount.

At step S312, remote authentication system 330 receives a first risk analysis result for the first risk data. For example, the remote authentication system 330 may receive a risk score from a server of data processing server(s) 340. As an example, the risk score may have a value of '70: moderate risk,' which may be used as a factor in authorizing the requested action.

At step S313, remote authentication system 330 requests data processing for second risk data. In one embodiment, the request received from authentication application 310B in step S309 may contain multiple types of risk data. Second risk data separate from first risk data processed at step S311 may be sent to a specialized server for analysis. For example, the second risk data may comprise one or more device identifiers involved in the requested action, which a specialized server of data processing server(s) 340 can compare to a negative list of stolen devices. This may allow data processing server to flag the requested action as fraudulent and aid in determining an authorization result.

At step S314, data processing server(s) 340 processes the second risk data. For example, a data processing server may obtain a device identifier and/or user account identifier and may compare the identifier(s) to a database of negative lists for devices and/or accounts reported as hacked or stolen.

The data processing server can then generate a notification of 'listed' or 'not listed' as reported.

At step S315, data processing server(s) 340 sends a second risk analysis result to remote authentication system 330. For example, the data processing server(s) 340 may send a result to the remote authentication system 330 that indicates that the devices and/or accounts have been flagged as fraudulent. The remote authentication system 330 can then use the second risk analysis as a factor in determining an authorization result.

At step S316, remote authentication system 330 determines an authentication/authorization result. The authentication/authorization result may be based on one or more risk analyses, including the first risk analysis and second risk analysis received in steps S312 and S315 respectively. In one embodiment, the authentication/authorization result may further be based on a master risk model of remote authentication system 330. For example, a graph learning model generated based on historical actions performed by a plurality of user devices may be used to determine if the requested action matches expected behavior. Examples of historical actions can include, but may not be limited to, a quantity of actions requested over time, authentication information or settings, device settings changed, and a recorded history of opening or utilization of specified applications. Based on the characteristics and/or features of the requested action in relation to the graph learning model, it can be determined if the involved user/user devices are behaving as expected, and thus whether or not they should be authorized.

At step S317, remote authentication system 330 sends a response to the authentication/authorization request sent by controlled application(s) 310A in step S302. The authorization result determined in step S316 may be included in a data message that can be sent and received by a mobile device on which authentication application 310B is stored. For example, an authentication result of 'valid user' may be included in an authentication response message which may be generated and sent by a server computer to authentication application 310B over a secure communications channel. It should be understood that any number of suitable communications means may be used to transmit and receive the response, such as WiFi, SMS, SS7 signaling, Bluetooth, 3G, 4G, 5G, etc.

At step S318, authentication application 310B forwards the response to controlled application(s) 310A. In one embodiment, controlled application(s) 310A may comprise an API for receiving responses from authentication application 310B and interpreting each response in order to allow or block access to the requested action. For example, controlled application(s) 310A may be an application for controlling an IOT device of user 301 (e.g. remotely controlling a home security/climate system, communicating with a self-driving car, and/or interacting with any other automated machine or appliance). As such, the controlled application(s) 310A may allow or block access to user preferences or other inherent facilities based on responses received from authentication application 310B.

At step S319, the response is communicated to the user. For example, an indication of 'access denied' or 'access granted' may be displayed on a screen to the user. As other examples, the response can be spoken to the user and/or communicated to the user using an assigned sound or haptic feedback (e.g. a wearable device beeping twice for 'authorized' and vibrating for 'declined').

Figure 4:
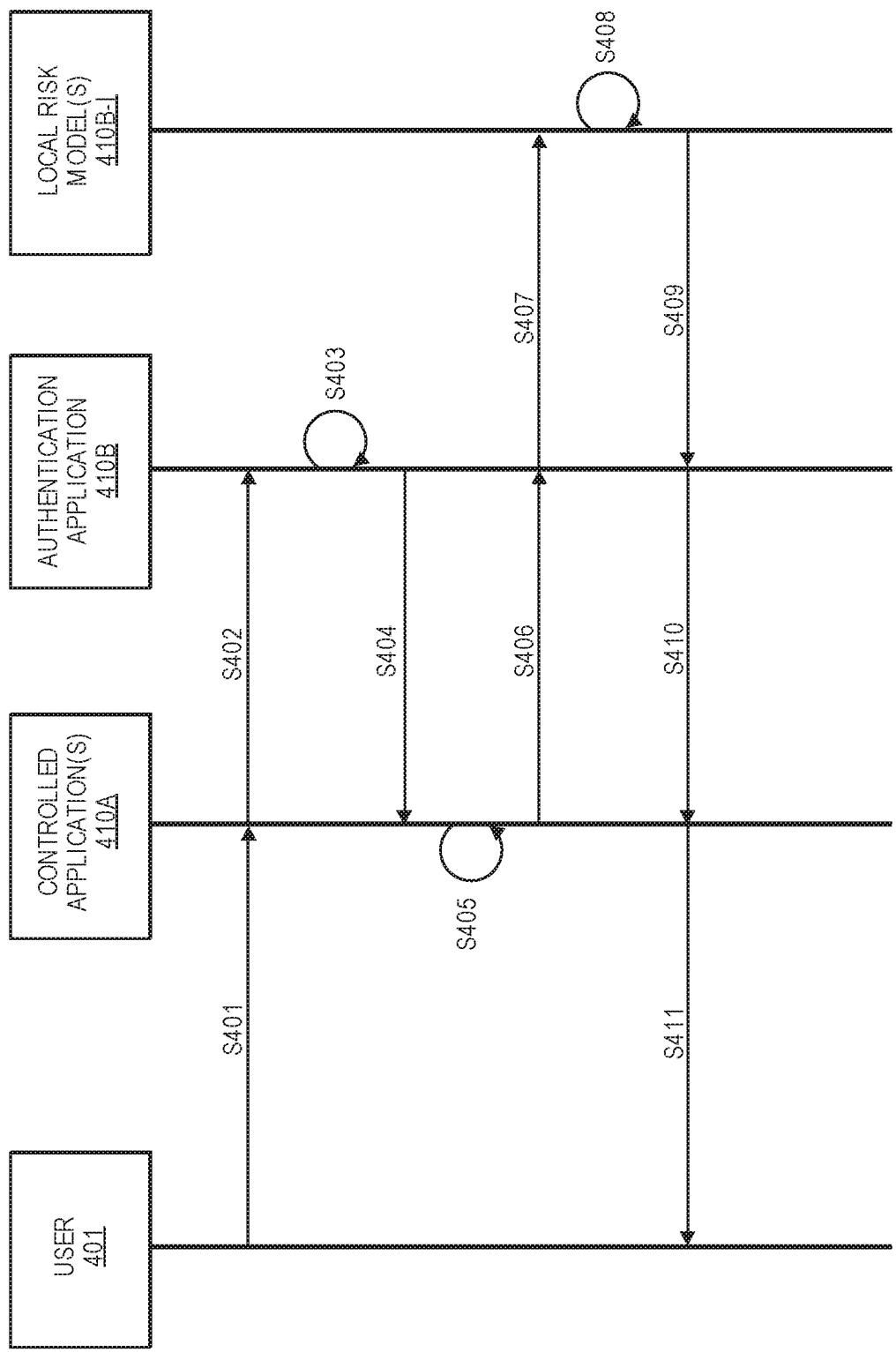
FIG. 4 shows a swim-lane diagram of an offline authentication process for a device action according to an embodiment.

FIG. 4 shows a swim-lane diagram of an offline authentication process for a device action according to an embodiment. Process 400 may involve a user 401 operating a user device (not shown). The user 401 and operable user device can be any user and user device shown in FIG. 1 respectively (i.e. user 101, user device 111, user 102, user device 112, etc.). The user device can also be user device 210 of FIG. 2. Furthermore, user 401, controlled application 410A, and authentication application 410B may correspond to user 301, controlled application 310A, and authentication application 310B of FIG. 3 respectively.

Process 400 may further involve a local risk model(s) 410B-I stored locally on the user device of user 401. In one embodiment, local risk model(s) 410B-I may be included as part of authentication application 410B. Local risk model(s) 410B-I may be a predictive model for identifying risk based on historical information and trends. For example, local risk model(s) 410B-I may comprise a machine learning model that has been trained using device information collected over time. In one embodiment, the local risk model(s) 410B-I may comprise a graph learning model. In an embodiment, the local risk model(s) 410B-I can be a portion of a master risk model. For example, the master risk model may comprise a graph of user communities, and the local risk model(s) 410B-I may comprise a portion of the graph containing one or more communities relevant to user 401.

At step S401, user 410 initiates an action at controlled application 410A. For example, the action may be for accessing and/or logging into controlled application 410A. As another example, the initiated action may be an action for changing data stored in the controlled application 410A, such as user information and/or stored files. Other examples of initiated actions may include changing settings and/or preferences, as well as performing an operation such as conducting a transaction or exchanging a data file with another device.

At step S402, controlled application 410A requests approval for the initiated action from authentication application 410B. In embodiments, authentication application 410B may provide secure authentication and authorization of actions for controlled application 410A. In one embodiment, services and functions of authentication application 410B may be provided to controlled application(s) 410 using an API installed at controlled application(s) 410. For example, the API may allow controlled application(s) 410A to exchange data with authentication application 410B (e.g. such as in the form of a request message or API call) and may additionally allow controlled application(s) 410A to receive and respond to commands for executing requested functions.

At step S403, authentication application 410B receives the request for approval and initiates an offline processing session, after the user device determines that it is not online and/or is incapable of communicating with the remote authentication server. In embodiments, authentication application 410B may be capable of performing authentication/authorization tasks in both online and offline settings. As previously explained, online authentication may be supported through communications with a remote authentication system (e.g. remote authentication system 130 of FIG. 1 remote authentication system 330 of FIG. 3) and in conjunction with data processing server(s) for processing a given type of authentication data and performing specialized authentication tasks/types of risk processing. Meanwhile, in an offline mode where the user device is not connected to a communications network and cannot establish a secure communication channel with the remote authentication system, local risk modeling and analysis can be performed by authentication application 410B. For example, a portion of a master authentication model or compressed file thereof may be stored locally at authentication application 410B, such that device information during a requested action can be analyzed in an offline session. In some instances, the offline session may be terminated and access to controlled application(s) 410A restricted if a requested action can be flagged as risky using the local risk model.

At step S404, authentication application 410B requests a scan of device information from controlled application 410A. To properly discern if a requested action is legitimate and safe to perform, the collection of device information for involved devices may be required. As such, upon initiating the offline authentication session, authentication application 410E may request a scan of device information that may be relevant for authentication, such as the device location, CPU usage, timestamp of action being taken, amount of memory, install, uninstall history, network connection history, etc. The request for the scan may be generated by authentication application 410E and sent to controlled application 410A, such as in a data message or automated command to controlled application(s) 410A (e.g. via a stored API on the user device).

At step S405, controlled application 410A performs the requested scan of device information. The scan may be for one or more device involved in the action, and may be for the device information sought by authentication application 410B in step S404. For example, the action may involve the transfer of digital currency between user devices, and device information such as device location, CPU usage, timestamp of action being taken, amount of memory, install, uninstall history, network connection history of both devices may be scanned. The scanned device information may be information that can be used to determine if the requested currency transfer is atypical and can further be used to score the action for its probability of involving a fraudulent actor.

At step S406, controlled application 410A sends the scanned device information to authentication application 410B. The device information may be received by authentication application 410B, which may identify, sort, and prepare the information as data that can be applied to local risk model(s) 410B-I. For example, the device information may be organized as an information vector that can be used as an input to a machine learning model that scores the vector for its probability of fraud.

At step S407, authentication application 410B receives and applies the device information to local risk model(s) 410B-1. In one embodiment, the local risk model(s) 410B-1 may comprise at least a portion of a master authentication model that is remotely store elsewhere. For example, the master authentication model may be a graph learning model stored at a server computer of remote authentication system 130 or 330 of FIG. 1 and FIG. 3 respectively. The local risk model(s) 410B-I may then be a portion of the graph model relevant to user 401, such as portions of a graph which contain data related to user 401's activity or data thereof (e.g. user 401's transaction history, location, browser history, downloads, social media activity, associated devices, etc.).

At step S408, a risk analysis is performed at the local risk model(s) 410B-I to generate a response/prediction. For example, an output may be generated to the device information applied by authentication application 410B in step S407. As an example, the device information may comprise the location, time, and amount of available memory for two devices involved in a requested data transfer or transaction, which when applied to the local risk model(s) 410B-1 results in a predicted presence of fraud. This may be due to a current device location that is far from the usual device location for user 401, an unusual time to be transacting, an unusually low amount of available memory, etc.

At step S409, the response is received from the local risk model(s) 410B-1. For example, the result determine in step S408 may be included in an authentication or authorization response message that restricts access to the requested function or resource. In one embodiment, a behavior tree may be referenced by authentication application 410B, so as to query for an appropriate action to take based on the determined riskiness. For example, the local risk model(s) 410B-1 may output an indication of 'High Risk,' which in a behavior tree may be associated with a response of 'Restrict Access.'

At step S410, authentication application 410B forwards the response to the controlled application(s) 410A. For example, the response may be reformatted as an API response that communicates the authentication result to controlled application(s) 410A. The response may then command the controlled application(s) 410A to perform an appropriate action such as following through with a data transfer, or instead, denying access and restricting offline usage of the controlled application(s) 410A (e.g. locking out the application until the user device reconnects to the Internet and receives further analyses or updates).

At step S411, the response is communicated to user 401. For example, an indication of "access denied" or "access granted" may be displayed on a screen to the user. As other examples, the response can be spoken to the user and/or communicated to the user using any other type of feedback such as sound, vibration, etc.

Figure 5:
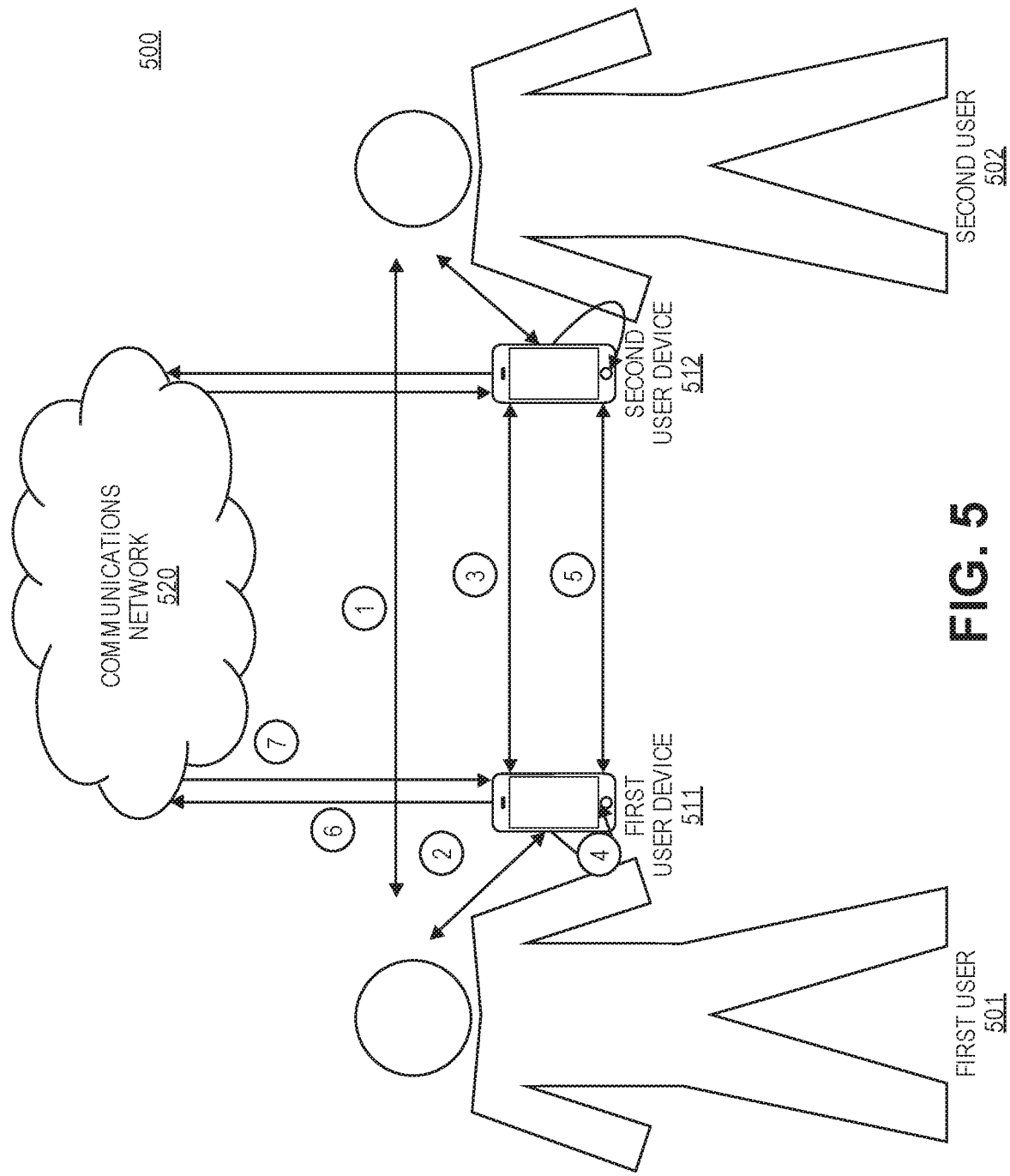
FIG. 5 shows an illustration of an interaction according to an embodiment.

FIG. 5 shows an illustration of an interaction according to an embodiment. The interaction can be a transfer of data between a first user 501 and a second user 502 via first user device 511 and second user device 512. For example, the data transfer may involve sharing personal information, music files, social media data, digital currency, or any other type file that can be shared between two devices. As another example, the data transfer can be a transfer of data needed to carry out a transaction between a consumer and merchant.

In embodiments, first user 501, second user 502, first user device 511, and second user device 512 can be first user 101, second user 102, first user device 111, and second user device 112 of FIG. 1 respectively. Furthermore, the first user device and second user device can be user device 210, which may further comprise controlled application(s) 310A and 410 A of FIGS. 3 and 4 as well as authentication application 310B and 410B of FIGS. 3 and 4. Communications network 520 may be communications network 120 of FIG. 1.

Referring to exemplary interaction 500, Steps 1 through 7 may correspond to actions taken by both parties involved in the interaction. The illustration shown may be of an offline interaction, in which connection to a communications network 520 by either device does not occur until after the interaction has been completed. Steps 1 through 5 may correspond to offline actions, while steps 6 and 7 may correspond to online actions taken when first user device 511 and second user device 512 regain access to communications network 520.

At step 1, first user 501 and second user 502 initiate an interaction. For example, first user 501 and second user 502 may agree to a transfer of funds, and may wish to use their devices to do so.

At step 2, first user 501 and second user 502 may attempt to carry out the interaction using controlled applications stored at first user device 511 and second user device 512 respectively. For example, first user 501 and second user 502 may each open a digital wallet application on their respective devices. The digital wallet application may be a controlled application for which particular functionalities require authentication to access, such as payment and funds transfer functions and/or other permissions such as changing settings, payment methods, and other user preferences. To conduct the funds transfer, the first and second user may enter the appropriate transaction information such as payment amount and payer/payee identity into their devices, which can be manually entered and/or auto filled (e.g. by providing one another with a QR code).

At step 3, first user device 511 and second user device 512 may scan device information. For example, an authentication application stored at each device may send a command to the controlled application to scan for the device's CPU usage, GPS coordinates, amount of memory, network connection history, etc. The devices may further communicate their scanned device information to each other. In one embodiment, device information may be exchanged using a secure data transfer method such as secure multi-party computation, such as through a garbled circuit protocol (e.g. Yao's garbled circuit).

At step 4, the first user device 511 and second user device 512 may perform risk analyses on the scanned device information. In one embodiment, the risk analysis may be performed at each device by applying the device information to a local risk model. For example, a graph learning model stored at an authentication application at each device may be used to score the probability of fraud associated with the requested interaction based on the CPU usage, GPS coordinates, amount of memory, and network connection history of the first user device 511 and second user device 512.

At step 5, first user device 511 and second user device 512 may perform the interaction depending on the risk analyses performed in step 4. For example, for an interaction relating to a payment transaction, the local risk model at first user device 511 may determine that the device information is associated with a high risk transaction, and may restrict access to the payment function of the controlled application stored at the first user device 511. Conversely, in another example, both the first user device 511 and second user device 412 may determine in step 4 that an interaction relating to the sharing of a file between the devices is low risk and may allow the file sharing to take place.

At step 6, first user device 511 and/or second user device 512 may regain connection to communications network 520. For example, the communications network 520 may be the Internet, which the first user 501 may access by joining a nearby WiFi connection from first user device 511. The WiFi connection may then allow the first user device 511 to establish communications with a remote authentication system over the Internet.

At step 7, first user device 511 and/or second user device 512 may receive an update from a remote authentication system over communications network 520. The update may be used to update the local risk model stored at the device's authentication application. In one embodiment, new information relating to markers of risky interactions that took place while the device was offline may be used to update a local graph learning model at the device such that it may accurately identify risky behavior in future offline interactions and take appropriate action. For example, an identified time of day and place may be associated with fraudulent transactions and/or hacked devices, which may prevent the first user device 511 from conducting offline interactions with other devices at the identified time and place.

Figure 6:
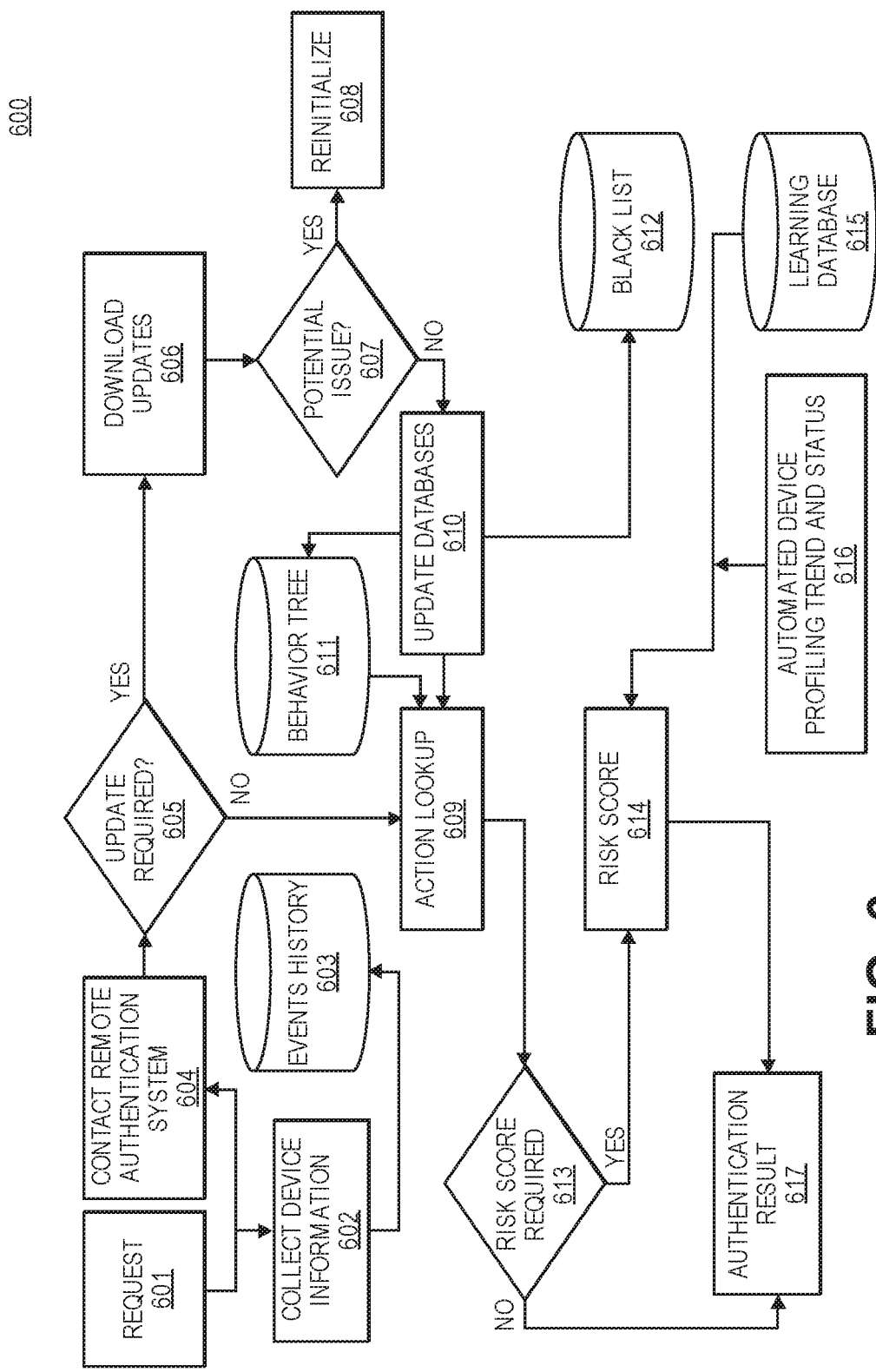
FIG. 6 shows a data flow diagram for an online authentication process conducted from a user device according to an embodiment.

FIG. 6 shows a data flow diagram for an online authentication process conducted from a user device according to an embodiment. Online request flow 600 comprises data flows 601 through 617, which may represent the flow of data during an online authentication/authorization process. The online authentication process may correspond to, for example, the process described by diagram 300 of FIG. 3. The process may be for accessing a personal account, a building or transportation terminal, conducting a payment transaction, etc.

When an online authentication process begins, a request 601 for a controlled action is generated at the user device. The user device may have online access and may send a message 604 for contacting a remote authentication system. Meanwhile, device information 602 may be collected, which may be information for one or more devices involved in the controlled action, such as a device location, CPU usage, available/used memory, etc. The collected device information 602 may be stored in a portion of memory 603 for storing events, such as requested actions and associated device information collected. For example, the portion of memory may be a cache history maintained by an authentication application stored on the device.

A decision 605 for an update can be determined, which may be based on a comparison of data stored at an authentication application to data received at the remote authentication system. For example, data for a local risk model stored at the user device may be compared to data for a master risk model stored at the remote authentication system to determine if the local risk model is up to date and contains the most recent data. If it is determined that an update is required, an update download 606 may be retrieved by the user device, A scan 607 for potential issues may then be performed, in which case, a re-initialization 608 of the update download 606 may be performed.

If no potential issues are found, a database update 610 may be performed. The databases may include a black list 612 of corrupted devices as well as a behavior tree 611 for determining appropriate actions to be taken by the user device. After the databases have been updated or after it has been determined that an update is not required, an action lookup 609 may be performed. The action lookup 609 may comprise a query based on the collected device information 602 and in comparison to actions listed in behavior tree 611. For example, the behavior tree 611 may specify that a data exchange with an interacting device that has less than 1% available memory should not be authorized.

Upon performing the action lookup 609, an assessment 613 for initiating risk scoring may be performed. If risk scoring is required, then a risk score 614 may be obtained. Information from an automated device profiling trend and status 616 and a learning database 615 may also be used to create the risk score 615. For example, device information and other interaction data may be compared to a graph learning model to determine a probability of fraud. This may include automated device profiling 616 for evaluating trends and status of the user device, as well as data in a learning database, which may comprise training data and/or machine learning models derived therefrom. Upon determining the risk score or upon determining that the risk score is not required, the authentication result 617 may be output.

Figure 7:
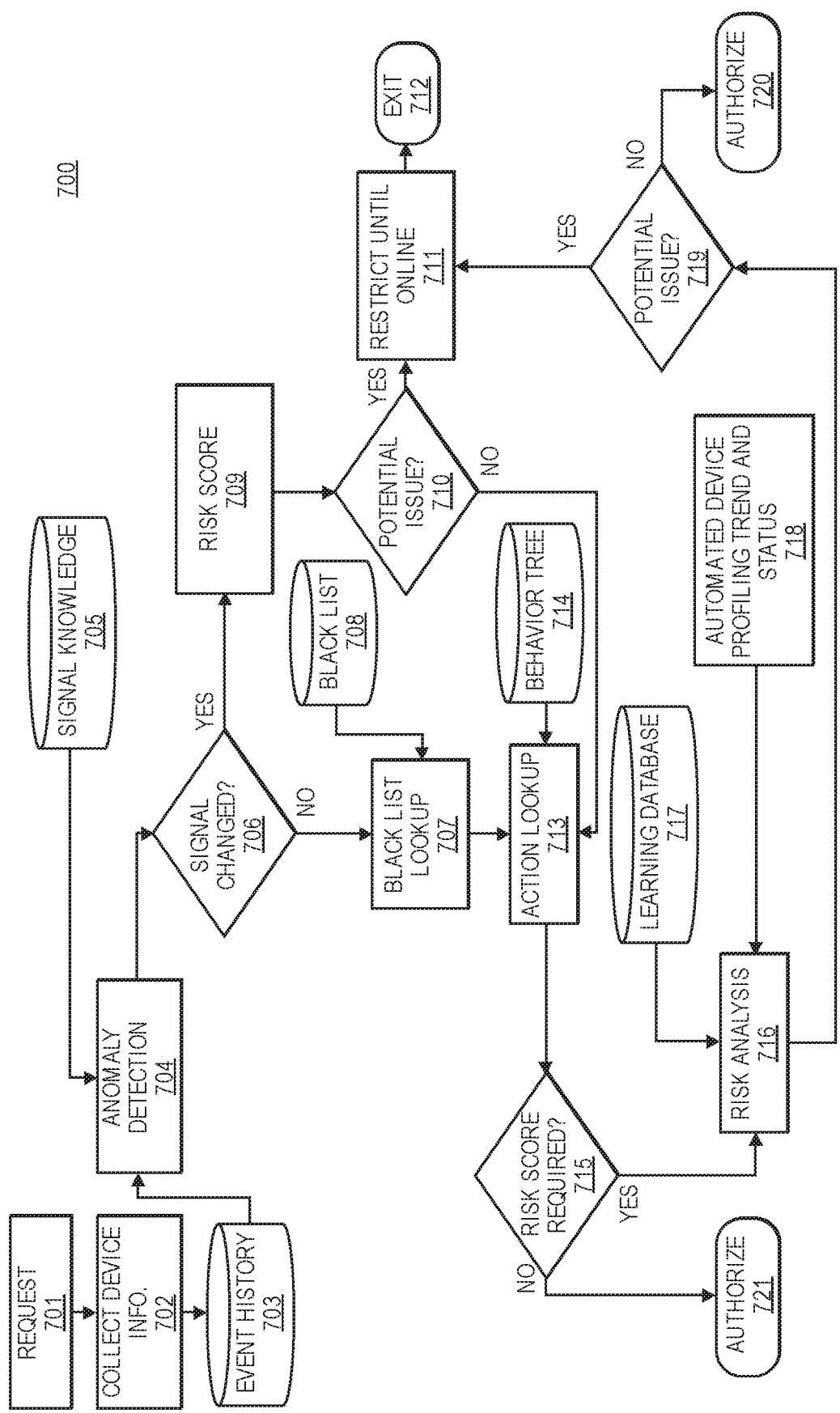
FIG. 7 shows a data flow diagram for an offline authentication process conducted from a user device according to an embodiment.

FIG. 7 shows a data flow diagram for an offline authentication process conducted from a user device according to an embodiment. Offline request flow 700 comprises data flows 701 through 721, which may represent the flow of data in an offline authorization/authentication process. The process can be for authorizing an account change, purchase, funds transfer, or any other offline action requiring a secure processing and/or exchange of data. For example, the offline request may correspond to the processes shown in FIG. 4 and FIG. 5 previously described.

An initial request 701 to execute a controlled action may be generated at a user device upon indication by a user. Upon initiating the request, device information 702 may be collected. The collected device information 702 may be recorded in an allocated memory store 703 of the user device. For example, memory store 703 may be a portion of memory allocated by an authentication application stored on the device for an events history of data relating to requested actions.

The device information may further be applied to a statistical analyzer 704 for detecting anomalies. This may include evaluating device information 702 against events history 703 as well as signal knowledgebase 705, which may comprise analyses of command sequences logged by the user device. The events history 703 and signal knowledgebase 705 may be used by the statistical analyzer 704 to compare against the collected device information 702 in order to flag a pattern that falls outside of the mean or causes a major shift in the distribution of expected results. For example, a requested action may be associated with an unusually high level of CPU usage or other abnormal behavior such as a high level of activity and/or memory utilization since the last update, reboot, or recharge of the device.

A determination 706 of an anomaly may be evaluated. If an anomaly in which a significant shift in expected signals has occurred, then risk scoring 709 may be applied to the action request. Based on the risk scoring 709, an inquiry 710 for a potential issue may be performed. If there is a potential issue (e.g. high risk score), then a restriction 711 may be placed on the requested action. Furthermore, one or more additional functions of the controlled application may be restricted until the user device gains online access. For example, in the case of a payment application, the user may be prohibited from accessing his or her financial accounts until he or she authenticates over the Internet, A lockout/exit 712 may then be initiated, so as to restrict access to the controlled action(s).

If the inquiry 710 does not indicate a potential issue or if determination 706 does not find an anomaly, then an action lookup 713 may be executed. The action lookup 713 may comprise querying a behavior tree 714 for an appropriate response based on the device information collected, and in conjunction with a black list lookup 707. The black list lookup 707 may comprise a query for corrupted data listed in black list database 708, which may be a local list of at least a portion of activity recently identified as risky (e.g. device identifiers for stolen devices or files flagged as malware).

Upon performing the action lookup 713, a decision 715 for determining if a risk score is required may be evaluated. For example, a risk score may be evaluated if the behavior tree 714 specifies that an action relating to financial accounts may be require a risk score. A risk analysis 716 may be performed if risk scoring is required. The risk analysis 716 may utilize data for a local machine learning model of learning database 717, such as a graph learning model comprising one or more relevant user community groups. In one embodiment, the local machine learning model may comprise data for at least a portion of a master machine learning model maintained by a remote authentication system. The risk analysis may further utilize data relating to automated device profiling trends and status 718.

An assessment 719 for a potential issue may be generated based on the risk analysis, in which either an authorization 720 or restriction 711 of the requested action can then be implemented. Regarding actions for which a risk analysis is not required, such as actions trivial actions involving non-sensitive data, a simple authorization 721 of the action may be implemented and the requested action may be executed.

Figure 8:
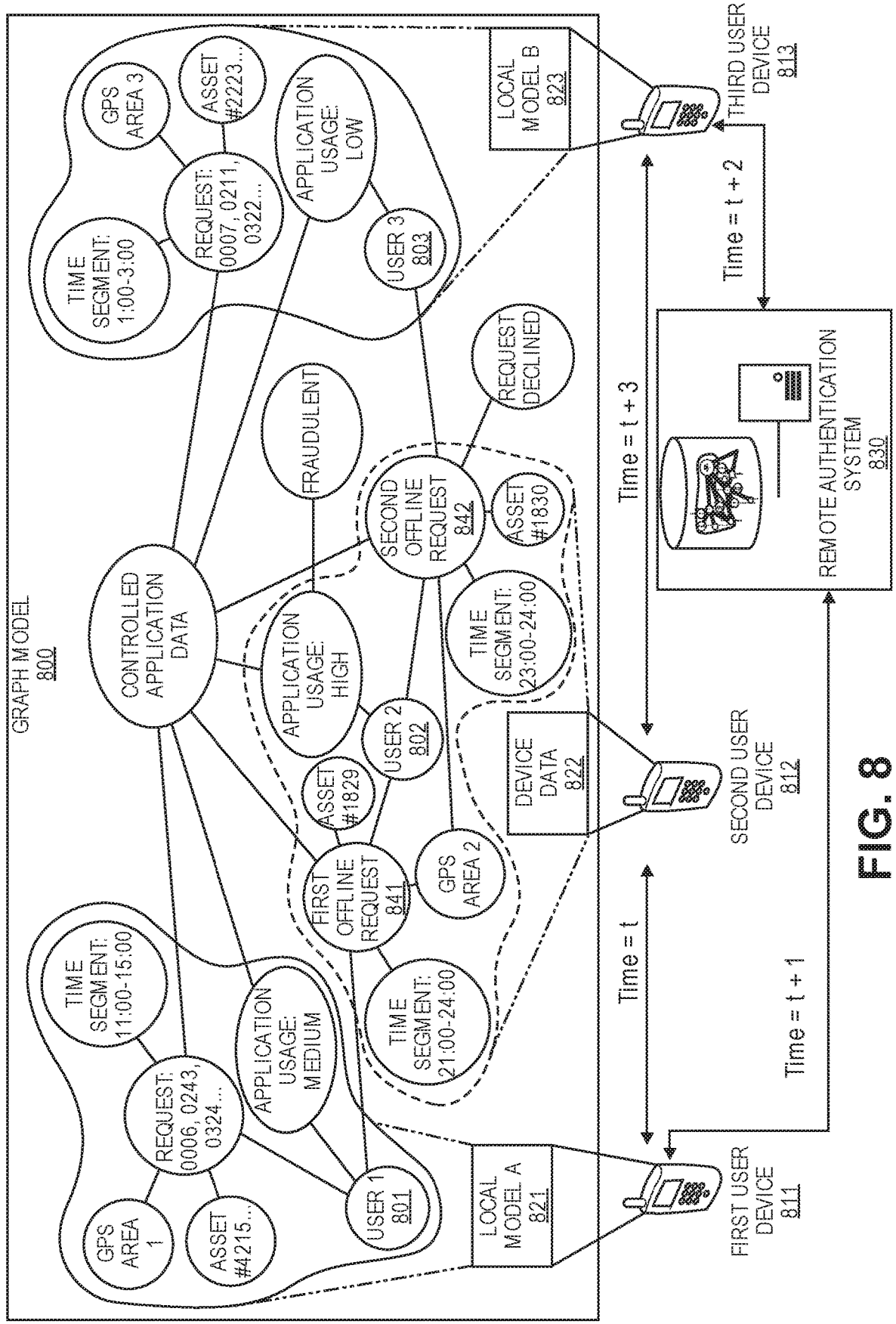
FIG. 8 shows an illustration of a graph model update according to an embodiment.

FIG. 8 shows an illustration of a graph model update according to an embodiment. Graph model 800 may comprise data relating to a plurality of requests collected from a plurality of devices, such as first user device 811, second user device 812, and third user device 813. In embodiments, graph model 800 may be used as a master authentication model generated and updated by remote authentication system 830. Furthermore, the master authentication model may be used to derive local authentication models comprising a series of graphs describing a user's typical request behavior, such as the user's most likely GPS coordinates, application usage level, and time of day to be making a request.

Each of the requests may be a request to perform a function of a contra led application stored at each of the devices. The controlled application may be an application in which specific functions require authorization to perform. For example, the controlled application may be a digital wallet application, in which an exchange of assets can be executed via mobile device. An exchange, however, may require an authentication of the users involved, which may be performed by a remote authentication system when online or locally on a device using a local authentication model when offline.

With reference to FIG. 8, at an initial time, time=t, second user device 813 may generate first offline request to perform a controlled tasks such as sending an asset to second user device 812. For example, a user of first user device 811 may wish to collect payment from a user in possession of second user device 812. The first offline request may include request data such as a timestamp for the request, GPS coordinates of devices during the request, etc. In order for the request to be authorized, a scan for device information may be performed and compared to local authentication models. For example, device data 822 stored on second user device 812 may be collected by first user device 811 and compared to local model A 821. Based on the comparison of the scanned device information, the request may be evaluated. For example, local model A 821 may determine that the device data 822 may be moderately risky.

Afterwards, at time=t+1, first user device 811 may establish communications with remote authentication system 830 over a network. The scanned device information collected during the first offline request 841 as well as device information collected from other requests generated by other devices may be aggregated by the remote authentication system 830. The remote authentication system 830 may then use the aggregated information to update graph model 800. For example, the updated graph model 800 may comprise an indication that requests associated with a location of "GPS Area 2", and a timestamp occurring at a time of day between "21:00 and 24:00" are associated with abnormally high CPU usage and memory consumption by the controlled application and should be flagged as fraudulent. The remote authentication system 830 may further use the updated graph model 800 to derive updated local graph models that can be distributed to a plurality of user devices. More information regarding using distributing portions of a graph model to a plurality of devices can be found in U.S. patent application Ser. No. 15/639,094, filed on Jun. 30, 2017, which is herein incorporated by reference in its entirety for all purposes.

At time=t+2, third user device 813 may establish communications with remote authentication system 830 over a network. During the established communication, remote authentication system 830 may provide an update to local model B 823 stored on third user device 813. For example, the updated local model B 823 may comprise new information relating to risk features recently associated with fraudulent behavior.

At time=t+3, second user device 812 may generate a second offline request 842 to interact with third user device 813. Device information from second user device 812 may be scanned and compared to local model B 823 to perform a risk analysis for second offline request 842. Based on the comparison, the third user device 813 may authorize or decline the request. For example, device information 822 may be associated with information marked as high risk or fraudulent by local model B 823, and second offline request 842 may be declined. As such, only requests assessed as low risk by local authentication models stored at involved devices may be authorized offline.

Embodiments provide a number of technical advantages over prior art. Embodiments allow for the authorization of operations that are typically limited to an online environment where a remote system can more easily manage security risks and perform authentication tasks. In embodiments, local authentication models derived from a master graph model can be stored at each device, and can be used to assess atypical and fraudulent behavior. The local authentication models can accurately authorize transactions, despite the fact that the devices which use them may not be online.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

It should be understood that the present invention as described above can be implemented in the form of control logic using hardware and/or using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer program product (e.g. a hard drive, a CD, or an entire computer system), and may be present on or within different computer program products within a system or network. A computer system may include a monitor, printer, or other suitable display for providing any of the results mentioned herein to a user.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A method comprising:
    receiving, by a first communication device, a first local authentication model, the first local authentication model being derived from a master authentication model at a remote server computer to be stored on the first communication device, wherein the master authentication model determines a risk score for an interaction based a history of interactions;
    storing, on the first communication device, the received first local authentication model;
    receiving, by the first communication device, a request to perform an interaction with a second communication device, the interaction being performed in an offline manner;
    applying, by the first communication device, the stored first local authentication model to the interaction to determine a first authentication result;
    determining, by the first communication device, whether or not to allow the interaction to proceed based upon the first authentication result,
        wherein determining whether or not to allow the interaction to proceed based on the first authentication result comprises:
            detecting one or more anomalies associated with the interaction;
            initiating a risk analysis based on the anomalies to determine the risk score for the interaction; and
            determining an appropriate action relating to the risk score, wherein determining the appropriate action relating to the risk score comprises referencing a behavior tree; and
    updating, by the first communication device, the first local authentication model using the master authentication model when the first communication device is online.

2. The method of claim 1, wherein the appropriate action relating to the risk score comprises restricting offline access to one or more applications of the first communication device.

3. The method of claim 1, wherein the interaction is associated with device information, and wherein the device information includes one or more risk features including one or more of: a rate of CPU usage, an install/uninstall history, and a network connection history.

4. The method of claim 3, wherein the device information is encrypted using secure multi-party computation.

5. The method of claim 1, wherein the master authentication model is a graph learning model generated from a plurality of requests to perform a plurality of interactions generated at a plurality of devices, and wherein the first local authentication model comprises one or more communities for a user of the first communication device.

6. The method according to claim 1, wherein the history of interactions is collected data comprising information associated with a data transfer.

7. The method according to claim 6, wherein the information associated with the data transfer comprises a file size, a device location.

8. The method according to claim 1, further comprising, communicating, to a user, a result of whether or not the interaction is allowed.

9. A first communication device comprising:
a processor including a memory;
a communication interface; and
a non-transitory computer-readable medium storing instructions executable by the processor, the instructions including a method comprising:
receiving a first local authentication model, the first local authentication model being derived from a master authentication model at a remote server computer to be stored on the first communication device, wherein the master authentication model determines a risk score for an interaction based a history of interactions;
storing, on the first communication device, the received first local authentication model
receiving a request to perform an interaction with a second communication device, the interaction being performed in an offline manner;
applying the stored first local authentication model to the interaction to determine a first authentication result;
determining whether or not to allow the interaction to proceed based upon the first authentication result,
wherein determining whether or not to allow the interaction to proceed based on the first authentication result comprises:
detecting one or more anomalies associated with the interaction;
initiating a risk analysis based on the anomalies to determine the risk score for the interaction; and
determining an appropriate action relating to the risk score, wherein determining the appropriate action relating to the risk score comprises referencing a behavior tree; and
updating the first local authentication model using the master authentication model when the first communication device is online.

10. The first communication device of claim 9, wherein the appropriate action relating to the risk score comprises restricting offline access to one or more applications of the first communication device.

11. The first communication device of claim 9, wherein the interaction is associated with device information, and wherein the device information includes one or more risk features including one or more of: a rate of CPU usage, an install/uninstall history, and a network connection history.

12. The first communication device of claim 11, wherein the device information is encrypted using secure multi-party computation.

13. The first communication device of claim 9, wherein the master authentication model is a graph learning model generated from a plurality of requests to perform a plurality of interactions generated at a plurality of devices, and wherein the first local authentication model comprises one or more communities for a user of the communication device.

14. A method comprising:
receiving, by a server computer, data for a plurality of requests to perform a plurality of interactions generated at a plurality of communication devices;
generating, by the server computer, a master authentication model based on the data for the plurality of requests to perform the plurality of interactions, wherein the master authentication model determines a risk score for an interaction based a history of interactions;
deriving, by the server computer, one or more local authentication models from the master authentication model; and
distributing, by the server computer, the one or more local authentication models to one or more communication devices,
wherein the one or more location authentication models are stored on the one or more communication devices,
wherein the one or more communication devices apply one or more requests to perform one or more offline interactions to the one or more local authentication models to determine an authentication result for the one or more requests, and
wherein the one or more authentication models are configured to determine whether or not to allow an interaction to proceed by detecting one or more anomalies associated with the interaction, initiating a risk analysis based on the anomalies to determine a risk score for the interaction, and determining an appropriate action relating to the risk score, wherein determining the appropriate action relating to the risk score comprises referencing a behavior tree.

15. The method of claim 14, further comprising:
receiving, by the server computer, data relating to the one or more requests to perform the one or more offline interactions;
updating, by the server computer, the master authentication model based on the data relating to the one or more requests to perform the one or more offline interactions to generate an updated master authentication model;
deriving, by the server computer, one or more updated local authentication models from the updated master authentication model; and
distributing, by the server computer, the one or more local authentication models to the one or more communication devices, wherein the one or more communication devices apply one or more additional requests to perform one or more additional offline interactions to the one or more updated local authentication models to determine authentication results for each of the one or more additional requests.

* * * * *